United States Patent
Nozaki et al.

(10) Patent No.: US 12,503,189 B2
(45) Date of Patent: Dec. 23, 2025

(54) CONTROL SYSTEM FOR HUMAN-POWERED VEHICLE, COMPONENT FOR HUMAN-POWERED VEHICLE, CONTROL PROGRAM RELATED TO COMPONENT FOR HUMAN-POWERED VEHICLE, AND METHOD FOR CONTROLLING COMPONENT FOR HUMAN-POWERED VEHICLE

(71) Applicant: Shimano Inc., Osaka (JP)

(72) Inventors: Akihiro Nozaki, Osaka (JP); Hiroko Matsubayashi, Osaka (JP)

(73) Assignee: Shimano Inc., Osaka (JP)

( * ) Notice: Subject to any disclaimer, the term of this patent is extended or adjusted under 35 U.S.C. 154(b) by 163 days.

(21) Appl. No.: 18/422,455

(22) Filed: Jan. 25, 2024

(65) Prior Publication Data

US 2024/0278868 A1    Aug. 22, 2024

(30) Foreign Application Priority Data

Feb. 21, 2023  (JP) ................................. 2023-025228

(51) Int. Cl.
*B62J 45/20*  (2020.01)
*B62J 50/22*  (2020.01)

(52) U.S. Cl.
CPC ............... *B62J 45/20* (2020.02); *B62J 50/22* (2020.02)

(58) Field of Classification Search
CPC ............ B62J 45/20; B62J 50/22; H04W 4/60; H04W 12/06; H04W 12/47; H04W 4/80;
(Continued)

(56) References Cited

U.S. PATENT DOCUMENTS 9,491,788 B1    11/2016  Kasai et al.
10,420,157 B2    9/2019  Chuang et al.
(Continued)

FOREIGN PATENT DOCUMENTS

DE    102019205666 A1 * 10/2019  .............. B62M 6/90
JP    2018-103688 A    7/2018
(Continued)

*Primary Examiner* — Brian A Zimmerman
*Assistant Examiner* — Anthony D Afrifa-Kyei
(74) *Attorney, Agent, or Firm* — Global IP Counselors, LLP

(57) ABSTRACT

A human-powered vehicle control system includes a first component and a second component. The first component includes a first electronic controller, a first wireless communicator, and a first storage. The second component includes a second electronic controller, a second wireless communicator, and a second storage. The second electronic controller controls the second wireless communicator to transmit second identification information of the second component to a communication device. The first electronic controller controls the first wireless communicator to transmit first identification information of the first component to the second component in response to receipt of the second identification information by the first wireless communicator from the communication device. The second electronic controller controls the second storage to store the first identification information in response to receipt of the first identification information by the second wireless communicator from the first component.

20 Claims, 8 Drawing Sheets

(58) Field of Classification Search
CPC ..... H04W 8/245; H04W 88/02; H04W 76/36; H04W 76/00; H04W 76/30; H04W 76/34; H04W 76/14; H04W 12/50; H04W 76/10; H04W 8/005; H04W 4/70; G06F 21/44; G06F 21/57; G06F 8/65; G06F 2221/2129; G06F 13/102; G06F 13/00; G06F 13/10; H04B 1/401; H04B 5/0037; H04B 5/20; H04B 5/70; H04B 1/02; H04B 1/06; H04M 1/185; H04M 1/72412; H04M 1/00; H04M 1/72; H04M 1/724; H04M 1/72403; H04M 1/72409; H04M 1/72406; H04M 1/72448; H04M 1/72454; H04M 11/00; H04L 63/0853; H04L 29/10; G05B 15/02; H04Q 9/00
See application file for complete search history.

(56) References Cited

U.S. PATENT DOCUMENTS

| | | |
|---|---|---|
| 11,451,444 B2 | 9/2022 | Chuang |
| 2018/0178870 A1 | 6/2018 | Takeshita et al. |
| 2019/0300102 A1* | 10/2019 | Ishikawa ................ B60L 58/10 |
| 2020/0189689 A1 | 6/2020 | Wesling |
| 2021/0284284 A1 | 9/2021 | Ho |
| 2022/0371681 A1 | 11/2022 | Lin et al. |

FOREIGN PATENT DOCUMENTS

| | | | | |
|---|---|---|---|---|
| JP | 2019-189137 A | 10/2019 | | |
| JP | 2019189138 A | * 10/2019 | ............ | B62M 6/90 |
| JP | 2020-82801 A | 6/2020 | | |
| JP | 2020-170993 A | 10/2020 | | |
| JP | 2023-6404 A | 1/2023 | | |

\* cited by examiner

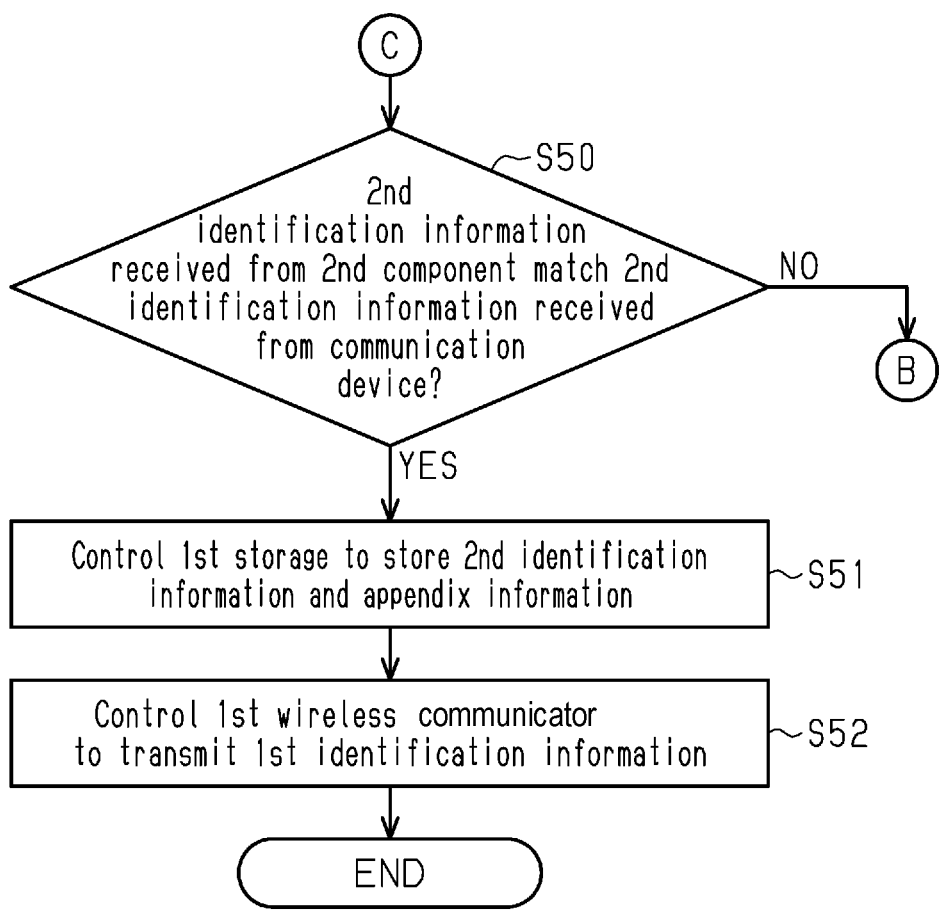

CONTROL SYSTEM FOR HUMAN-POWERED VEHICLE, COMPONENT FOR HUMAN-POWERED VEHICLE, CONTROL PROGRAM RELATED TO COMPONENT FOR HUMAN-POWERED VEHICLE, AND METHOD FOR CONTROLLING COMPONENT FOR HUMAN-POWERED VEHICLE

CROSS-REFERENCE TO RELATED APPLICATIONS

This application claims priority to Japanese Patent Application No. 2023-025228, filed on, Feb. 21, 2023. The entire disclosure of Japanese Patent Application No. 2023-025228 is hereby incorporated herein by reference.

BACKGROUND

Technical Field

The present disclosure generally relates to a control system for a human-powered vehicle, a component for a human-powered vehicle, a control program related to a component for a human-powered vehicle, and a method for controlling a component for a human-powered vehicle.

Background Information

Japanese Laid-Open Patent Publication No. 2019-189137 (Patent Document 1) discloses a control device for a human-powered vehicle configured to transmit pairing information, generated in accordance with pairing of components, to multiple components in a case where the components are paired.

SUMMARY

An objective of the present disclosure is to provide a control system for a human-powered vehicle, a component for a human-powered vehicle, a control program related to a component for a human-powered vehicle, and a method for controlling a component for a human-powered vehicle that exchange information between components in a preferred manner.

A control system in accordance with a first aspect of the present disclosure is for a human-powered vehicle. The control system comprises a first component and a second component. The first component includes a first electronic controller, a first wireless communicator, and a first storage. The second component includes a second electronic controller, a second wireless communicator, and a second storage. The first storage is configured to store first identification information of the first component and second identification information of the second component. The second storage is configured to store the first identification information and the second identification information. The second electronic controller is configured to control the second wireless communicator so that the second wireless communicator transmits the second identification information stored in the second storage to a communication device. The first electronic controller is configured to control the first wireless communicator so that the first wireless communicator transmits the first identification information stored in the first storage to the second component in response to receipt of the second identification information by the first wireless communicator from the communication device. The second electronic controller is configured to control the second storage so that the second storage stores the first identification information in response to receipt of the first identification information by the second wireless communicator from the first component.

With the control system according to the first aspect, the first electronic controller controls the first wireless communicator so that the first wireless communicator transmits the first identification information to the second component in response to receipt of the second identification information from the communication device, and the second electronic controller receives the first identification information from the first component. This allows the first component and the second component to exchange information via the communication device. Thus, the control system for a human-powered vehicle exchanges information between the components in a preferred manner.

With the control system according to the first aspect, the second storage stores the first identification information in response to receipt of the first identification information from the first component. This allows the second electronic controller to identify the first component.

In accordance with a second aspect of the present disclosure, the control system according to the first aspect is configured so that the first electronic controller is configured to control the first storage so that the first storage stores the second identification information obtained from the communication device through wireless communication.

With the control system according to the second aspect, the first electronic controller identifies the second component from the second identification information obtained via the communication device.

In accordance with a third aspect of the present disclosure, the control system according to the second aspect is configured so that the second electronic controller is configured to control the second wireless communicator so that the second wireless communicator transmits the second identification information to the first component. The first electronic controller is configured to compare the second identification information received from the second component with the second identification information received from the communication device.

With the control system according to the third aspect, the first electronic controller identifies the second component by comparing the second identification information received from the second component with the second identification information received from the communication device.

In accordance with a fourth aspect of the present disclosure, the control system according to any one of the first to third aspects is configured so that the second electronic controller is configured to control the second wireless communicator so that the second wireless communicator continuously or intermittently transmits the second identification information to the first component. The second electronic controller is configured to control the second wireless communicator so that the second wireless communicator stops transmission of the second identification information upon receipt of the first identification information.

With the control system according to the fourth aspect, the second electronic controller stops transmission of the second identification information in response to receipt of the first identification information. Thus, electric power is not consumed to transmit the second identification information after the first identification information is received.

A control system in accordance with a fifth aspect of the present disclosure is for a human-powered vehicle. The control system comprises a first component and a second component. The first component includes a first electronic controller, a first wireless communicator, and a first storage. The second component includes a second electronic controller, a second wireless communicator, and a second storage. The first storage is configured to store first identification information of the first component and second identification information of the second component. The second storage is configured to store the first identification information and the second identification information. The second electronic controller is configured to control the second wireless communicator so that the second wireless communicator transmits the second identification information stored in the second storage to a communication device. The first electronic controller is configured to control the first storage so that the first storage stores the second identification information in response to receipt of the second identification information by the first wireless communicator from the communication device. The second electronic controller is configured to control the second wireless communicator so that the second wireless communicator transmits the second identification information to the first component. The first electronic controller is configured to compare the second identification information received from the second component with the second identification information received from the communication device.

With the control system according to the fifth aspect, the first electronic controller identifies the second component by comparing the second identification information received from the second component with the second identification information received from the communication device. This allows the first electronic controller to perform communication with the second component in a preferred manner. Thus, the control system for a human-powered vehicle exchanges information between the components in a preferred manner.

In accordance with a sixth aspect of the present disclosure, the control system according to the third or fifth aspect is configured so that the second electronic controller is configured to control the second wireless communicator so that the second wireless communicator transmits appendix information that is appended to the second identification information to the first component. The first electronic controller is configured to store the appendix information received from the second component to the first storage in a case where the second identification information received from the second component matches the second identification information received from the communication device.

With the control system according to the sixth aspect, the first electronic controller stores the appendix information received from the second component to the first storage in a case where the second identification information received from the second component matches the second identification information received from the communication device. This allows the first electronic controller to obtain the appendix information of the second component. Thus, the first electronic controller executes control in accordance with the appendix information.

In accordance with a seventh aspect of the present disclosure, the control system according to the sixth aspect is configured so that the appendix information includes at least one of type, serial number, model, and icon of the second component.

With the control system according to the seventh aspect, the first electronic controller obtains at least one of the type, serial number, model, and icon of the second component.

In accordance with an eighth aspect of the present disclosure, the control system according to any one of the first to seventh aspects further comprises the communication device. The communication device includes a communication device controller and a wireless communicator. The communication device controller is configured to control the wireless communicator so that the wireless communicator transmits the second identification information to the first component in response to receipt of the second identification information from the second component through wireless communication.

With the control system according to the eighth aspect, the first electronic controller obtains the second identification information via the communication device in a preferred manner.

In accordance with a ninth aspect of the present disclosure, the control system according to the eighth aspect is configured so that the communication device further includes a display unit. The communication device controller is configured to control the display unit so that the display unit displays relevant information related to the second component upon receipt of the second identification information.

With the control system according to the ninth aspect, the communication device controller shows the relevant information on the display unit in response to receipt of the second identification information. This allows the user to check the relevant information on the display unit.

In accordance with a tenth aspect of the present disclosure, the control system according to the ninth aspect is configured so that the relevant information includes at least one of type, serial number, model, the second identification information, and icon of the second component.

With the control system according to the tenth aspect, the user can check at least one of the type, serial number, model, second identification information, and icon of the second component on the display unit.

In accordance with an eleventh aspect of the present disclosure, the control system according to any one of the eighth to tenth aspects is configured so that the communication device further includes a communication device operating portion. The communication device controller is configured to control the wireless communicator so that the wireless communicator transmits the second identification information to the first component in response to selection of the second component by a user through the communication device operating portion.

With the control system according to the eleventh aspect, the communication device controller controls the wireless communicator so that the wireless communicator transmits the second identification information to the first component in response to selection of the second component by the user through the communication device operating portion. This allows the user to select the second identification information transmitted to the first component by operating the communication device operating portion.

In accordance with a twelfth aspect of the present disclosure, the control system according to any one of the first to eleventh aspects is configured so that the first component is configured to be paired with the second component in a state in which the communication device is paired with the first component.

With the control system according to the twelfth aspect, the second identification information is transmitted from the communication device to the first component in a state in which the communication device is paired with the first component.

In accordance with a thirteenth aspect of the present disclosure, the control system according to any one of the first to twelfth aspects is configured so that the second component includes an electric transmission device.

With the control system according to the thirteenth aspect, the first component and the electric transmission device exchange information in a preferred manner.

A control system in accordance with a fourteenth aspect of the present disclosure is for a human-powered vehicle. The control system comprises a communication device, a first component, and at least one second component. The first component is configured to perform wireless communication with the communication device. The at least one second component is different from the first component. The at least one second component is configured to perform wireless communication with the communication device and the first component. The communication device includes a wireless communicator, a communication device controller configured to control the wireless communicator, and a display unit. In a case where the at least one second component includes a plurality of second components configured to be paired with the first component, the display unit includes a screen configured to display relevant information related to at least one pairing candidate among the plurality of second components.

With the control system according to the fourteenth aspect, the communication device controller shows the relevant information on the display unit. This allows the user to check the at least one pairing candidate among the second components on the display unit and pair the first component with the second component. Thus, the control system for a human-powered vehicle exchanges information between the components in a preferred manner.

In accordance with a fifteenth aspect of the present disclosure, the control system according to the fourteenth aspect is configured so that the communication device further includes a communication device operating portion. The communication device controller is configured to pair the first component with the selected one or more of the at least one second component in response to selection of one or more of the at least one second component by a user through the communication device operating portion.

With the control system according to the fifteenth aspect, the user operates the communication device operating portion to pair the first component with one or more of the at least one second component.

In accordance with a sixteenth aspect of the present disclosure, the control system according to the fourteenth or fifteenth aspect is configured so that the relevant information includes at least one of type, serial number, model, second identification information, and icon of the at least one second component.

With the control system according to the sixteenth aspect, the user can check at least one of the type, serial number, model, second identification information, and icon of the second component on the display unit.

In accordance with a seventeenth aspect of the present disclosure, the control system according to any one of the fourteenth to sixteenth aspects is configured so that the communication device controller is configured to control the display unit so that the display unit does not display information related to the at least one second component in a case where a manufacturer of the at least one second component differs from a predetermined manufacturer.

With the control system according to the seventeenth aspect, the communication device controller controls the display unit so that the display unit shows only the at least one second component manufactured by the predetermined manufacturer.

In accordance with an eighteenth aspect of the present disclosure, the control system according to the fifteenth aspect is configured so that the first component is configured to be paired with the one or more of the at least one second component in a state in which the communication device is paired with the first component.

With the control system according to the eighteenth aspect, one or more pieces of the second identification information is transmitted from the communication device to the first component in a state in which the communication device is paired with the first component.

In accordance with a nineteenth aspect of the present disclosure, the control system according to any one of the first to eighteenth aspects is configured so that the first component is attachable to the human-powered vehicle.

With the control system according to the nineteenth aspect, the first component mounted on the human-powered vehicle and the second component exchange information in a preferred manner.

In accordance with a twentieth aspect of the present disclosure, the control system according to any one of the first to nineteenth aspects is configured so that the human-powered vehicle includes a drive unit system. The drive unit system includes a drive unit and a drive unit operating portion. The drive unit includes a motor configured to apply a propulsion force to the human-powered vehicle. The drive unit operating portion is configured to operate the drive unit. The first component includes the drive unit or the drive unit operating portion.

With the control system according to the twentieth aspect, the second component exchanges information with the drive unit or the drive unit operating portion in a preferred manner.

A component in accordance with a twenty-first aspect of the present disclosure is for a human-powered vehicle. The human-powered vehicle includes a first component differing from the component. The component comprises a second electronic controller, a second wireless communicator, and a second storage. The second storage is configured to store first identification information of the first component and second identification information of the component. The second electronic controller is configured to control the second wireless communicator so that the second wireless communicator transmits the second identification information stored in the second storage to a communication device. The second electronic controller is configured to control the second storage so that the second storage stores the first identification information in response to receipt of the first identification information from the first component by the second wireless communicator after the second identification information is transmitted to the communication device.

In accordance with a twenty-second aspect of the present disclosure, the component according to the twenty-first aspect is configured so that the second electronic controller is configured to control the second wireless communicator so that the second wireless communicator continuously or intermittently transmits the second identification information to the first component. The second electronic controller is configured to control the second wireless communicator so that the second wireless communicator stops transmitting the second identification information in response to receipt of the first identification information.

In accordance with a twenty-third aspect of the present disclosure, the component according to the twenty-first or twenty-second aspect is configured so that the component is an electric transmission device.

A non-transitory computer-readable medium encoded with a control program in accordance with a twenty-fourth aspect of the present disclosure is related to a component for a human-powered vehicle. The component includes a second electronic controller, a second wireless communicator, and a second storage. The control program comprises program instructions that when executed by the second electronic controller performs operations of transmitting second identification information of the component stored in the second storage to a communication device by controlling the second wireless communicator with the second electronic controller, and storing first identification information of a first component in response to the first identification information received by the second wireless communicator from the first component by controlling the second storage with the second electronic controller. The first component differs from the component.

In accordance with a twenty-fifth aspect of the present disclosure, the non-transitory computer-readable medium according to the twenty-fourth aspect further comprises operations of continuously or intermittently transmitting the second identification information to the first component by controlling the second wireless communicator with the second electronic controller, and stopping transmission of the second identification information in response to receipt of the first identification information by controlling the second wireless communicator with the second electronic controller.

In accordance with a twenty-sixth aspect of the present disclosure, the non-transitory computer-readable medium according to the twenty-fourth or twenty-fifth aspect is configured so that the control program is stored in the second storage.

A component in accordance with a twenty-seventh aspect of the present disclosure is for a human-powered vehicle. The human-powered vehicle includes a second component differing from the component. The component comprises a first electronic controller, a first wireless communicator, and a first storage. The first storage is configured to store first identification information of the component and second identification information of the second component. The first electronic controller is configured to control the first wireless communicator so that the first wireless communicator transmits the first identification information stored in the first storage to the second component in response to receipt of the second identification information from a communication device by the first wireless communicator.

In accordance with a twenty-eighth aspect of the present disclosure, the component according to the twenty-seventh aspect is configured so that the first electronic controller is configured to control the first storage so that the first storage stores the second identification information obtained from the communication device through wireless communication.

In accordance with a twenty-ninth aspect of the present disclosure, the component according to the twenty-eighth aspect is configured so that the first electronic controller is configured to compare the second identification information received from the second component with the second identification information received from the communication device.

In accordance with a thirtieth aspect of the present disclosure, the component according to the twenty-eighth or twenty-ninth aspect is configured so that the component is configured to be paired with the second component in a state in which the communication device is paired with the component.

In accordance with a thirty-first aspect of the present disclosure, the component according to any one of the twenty-seventh to thirtieth aspects is configured so that the component is attachable to the human-powered vehicle.

In accordance with a thirty-second aspect of the present disclosure, the component according to any one of the twenty-seventh to thirty-first aspects is configured so that the human-powered vehicle includes a drive unit system. The drive unit system includes a drive unit and a drive unit operating portion. The drive unit includes a motor configured to apply a propulsion force to the human-powered vehicle. The drive unit operating portion is configured to operate the drive unit. The component includes the drive unit or the drive unit operating portion.

A component in accordance with a thirty-third aspect of the present disclosure is for a human-powered vehicle. The human-powered vehicle includes a second component differing from the component. The component comprises a first electronic controller, a first wireless communicator, and a first storage. The first storage is configured to store first identification information of the component and second identification information of the second component. The first electronic controller is configured to control the first storage so that the first storage stores the second identification information in response to receipt of the second identification information from a communication device. The first electronic controller is configured to compare the second identification information received from the second component and the second identification information received from the communication device.

In accordance with a thirty-fourth aspect of the present disclosure, the component according to the thirty-third aspect is configured so that the second component includes a second electronic controller and a second wireless communicator. The second electronic controller is configured to control the second wireless communicator so that the second wireless communicator transmits appendix information that is appended to the second identification information to the component. The first electronic controller is configured to store the appendix information received from the second component to the first storage in a case where the second identification information received from the second component matches the second identification information received from the communication device.

In accordance with a thirty-fifth aspect of the present disclosure, the component according to the thirty-fourth aspect is configured so that the appendix information includes at least one of type, serial number, model, and icon of the second component.

In accordance with a thirty-sixth aspect of the present disclosure, the component according to any one of the thirty-third to thirty-fifth aspects is configured so that the component is configured to be paired with the second component in a state in which the communication device is paired with the component.

In accordance with a thirty-seventh aspect of the present disclosure, the component according to any one of the thirty-third to thirty-sixth aspects is configured so that the component is attachable to the human-powered vehicle.

In accordance with a thirty-eighth aspect of the present disclosure, the component according to any one of the thirty-third to thirty-seventh aspects is configured so that the human-powered vehicle includes a drive unit system. The drive unit system includes a drive unit and a drive unit operating portion. The drive unit includes a motor configured to apply a propulsion force to the human-powered vehicle. The drive unit operating portion is configured to operate the drive unit. The component includes the drive unit or the drive unit operating portion.

A non-transitory computer-readable medium encoded with a control program in accordance with a thirty-ninth aspect of the present disclosure is related to a component for a human-powered vehicle. The component includes a first electronic controller, a first wireless communicator, and a first storage. The control program comprises program instructions that when executed by the first electronic controller performs operations of transmitting first identification information of the component stored in the first storage to a second component in response to second identification information of the second component received by the first wireless communicator from a communication device by controlling the first wireless communicator. The second component differs from the component.

In accordance with a fortieth aspect of the present disclosure, the non-transitory computer-readable medium according to the thirty-ninth aspect further comprises operations of storing the second identification information obtained from the communication device through wireless communication in the first storage by controlling the first storage with the first electronic controller.

In accordance with a forty-first aspect of the present disclosure, the non-transitory computer-readable medium according to the thirty-ninth or fortieth aspect further comprises operations of comparing the second identification information received from the second component and the second identification information received from the communication device with the first electronic controller.

A non-transitory computer-readable medium control program in accordance with a forty-second aspect of the present disclosure is for a human-powered vehicle. The component includes a first electronic controller, a first wireless communicator, and a first storage. The control program comprises a step storing second identification information of a second component in response to the second identification information received by the first wireless communicator from a communication device by controlling the first storage, and comparing the second identification information received from the second component with the second identification information received from the communication device. The second component differs from the component.

In accordance with a forty-third aspect of the present disclosure, the non-transitory computer-readable medium according to the forty-second aspect further comprises operations of receiving the second identification information and appendix information that is appended to the second identification information from the second component with the first wireless communicator, and storing the appendix information received from the second component in the first storage in a case where the second identification information received from the second component matches the second identification information received from the communication device with the first electronic controller.

In accordance with a forty-fourth aspect of the present disclosure, the non-transitory computer-readable medium according to any one of the thirty-ninth to forty-third aspects is configured so that the control program is stored in the first storage.

A method in accordance with a forty-fifth aspect of the present disclosure is for controlling a component for a human-powered vehicle. The human-powered vehicle includes a first component and a second component. The first component includes a first electronic controller, a first wireless communicator, and a first storage. The second component includes a second electronic controller, a second wireless communicator, and a second storage. The first storage is configured to store first identification information of the first component and second identification information of the second component. The second storage is configured to store the first identification information and the second identification information. The method comprises transmitting the second identification information stored in the second storage to a communication device by controlling the second wireless communicator with the second electronic controller, transmitting the first identification information stored in the first storage to the second component in response to the second identification information received by the first wireless communicator from the communication device by controlling the first wireless communicator with the first electronic controller, and storing the first identification information in response to the first identification information received by the second wireless communicator from the first component by controlling the second storage with the second electronic controller.

In accordance with a forty-sixth aspect of the present disclosure, the method according to the forty-fifth aspect further comprises storing the second identification information obtained from the communication device through wireless communication in the first storage by controlling the first storage with the first electronic controller.

In accordance with a forty-seventh aspect of the present disclosure, the method according to the forty-fifth or forty-sixth aspect further comprises transmitting the second identification information to the first component by controlling the second wireless communicator with the second electronic controller, and comparing the second identification information received from the second component and the second identification information received from the communication device with the first electronic controller.

In accordance with a forty-eighth aspect of the present disclosure, the method according to any one of the forty-fifth to forty-seventh aspects further comprises continuously or intermittently transmitting the second identification information to the first component by controlling the second wireless communicator with the second electronic controller, and stopping transmission of the second identification information in response to receipt of the first identification information by controlling the second wireless communicator with the second electronic controller.

A method in accordance with a forty-ninth aspect of the present disclosure is for controlling a component for a human-powered vehicle. The human-powered vehicle includes a first component and a second component. The first component includes a first electronic controller, a first wireless communicator, and a first storage. The second component includes a second electronic controller, a second wireless communicator, and a second storage. The first storage is configured to store first identification information of the first component and second identification information of the second component. The second storage is configured to store the first identification information and the second identification information. The method comprises transmitting the second identification information stored in the second storage to a communication device by controlling the second wireless communicator with the second electronic controller, storing the second identification information in response to the second identification information received by the first wireless communicator from the communication device by controlling the first storage with the first electronic controller, transmitting the second identification information to the first component by controlling the second wireless communicator with the second electronic controller, and comparing the second identification information received from the second component and the second identification information received from the communication device with the first electronic controller.

In accordance with a fiftieth aspect of the present disclosure, the method according to the forty-ninth aspect further comprises transmitting appendix information that is appended to the second identification information to the first component by controlling the second wireless communicator with the second electronic controller, and storing the appendix information received from the second component in the first storage in a case where the second identification information received from the second component matches the second identification information received from the communication device with the first electronic controller.

In accordance with a fifty-first aspect of the present disclosure, the method according to the fiftieth aspect is configured so that the appendix information includes at least one of type, serial number, model, and icon of the second component.

In accordance with a fifty-second aspect of the present disclosure, the method according to any one of the forty-fifth to fifty-first aspects is configured so that the communication device includes a communication device controller and a wireless communicator. The method further comprises transmitting the second identification information to the first component in response to receipt of the second identification information from the second component through wireless communication by controlling the wireless communicator with the communication device controller.

In accordance with a fifty-third aspect of the present disclosure, the method according to the fifty-second aspect is configured so that the communication device further includes a display unit. The method further comprises displaying relevant information related to the second component in response to receipt of the second identification information by controlling the display unit with the communication device controller.

In accordance with a fifty-fourth aspect of the present disclosure, the method according to the fifty-third aspect is configured so that the relevant information includes at least one of type, serial number, model, the second identification information, and icon of the second component.

In accordance with a fifty-fifth aspect of the present disclosure, the method according to the fifty-second aspect is configured so that the communication device further includes a communication device operating portion. The method further comprises transmitting the second identification information to the first component in response to selection of the second component by a user through the communication device operating portion by controlling the wireless communicator with the communication device controller.

In accordance with a fifty-sixth aspect of the present disclosure, the method according to any one of the forty-fifth to fifty-fifth aspects is configured so that the first component is attachable to the human-powered vehicle.

In accordance with a fifth-seventh aspect of the present disclosure, the method according to any one of the forty-fifth to fifty-sixth aspects is configured so that the human-powered vehicle includes a drive unit system. The drive unit system includes a drive unit and a drive unit operating portion. The drive unit includes a motor configured to apply a propulsion force to the human-powered vehicle. The drive unit operating portion is configured to operate the drive unit. The first component includes the drive unit or the drive unit operating portion.

In accordance with a fifty-eighth aspect of the present disclosure, the method according to any one of the forty-fifth to fifty-seventh aspects is configured so that the first component includes an electric transmission device.

The control system for a human-powered vehicle, the component for a human-powered vehicle, the control program related to a component for a human-powered vehicle, and the method for controlling a component for a human-powered vehicle in accordance with the present disclosure exchange information between multiple components for a human-powered vehicle in a preferred manner.

BRIEF DESCRIPTION OF THE DRAWINGS

Referring now to the attached drawings which form a part of this original disclosure, an illustrative embodiment is shown.

FIG. 8 is a third part of the process executed by the first electronic controller shown in FIG. 2.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
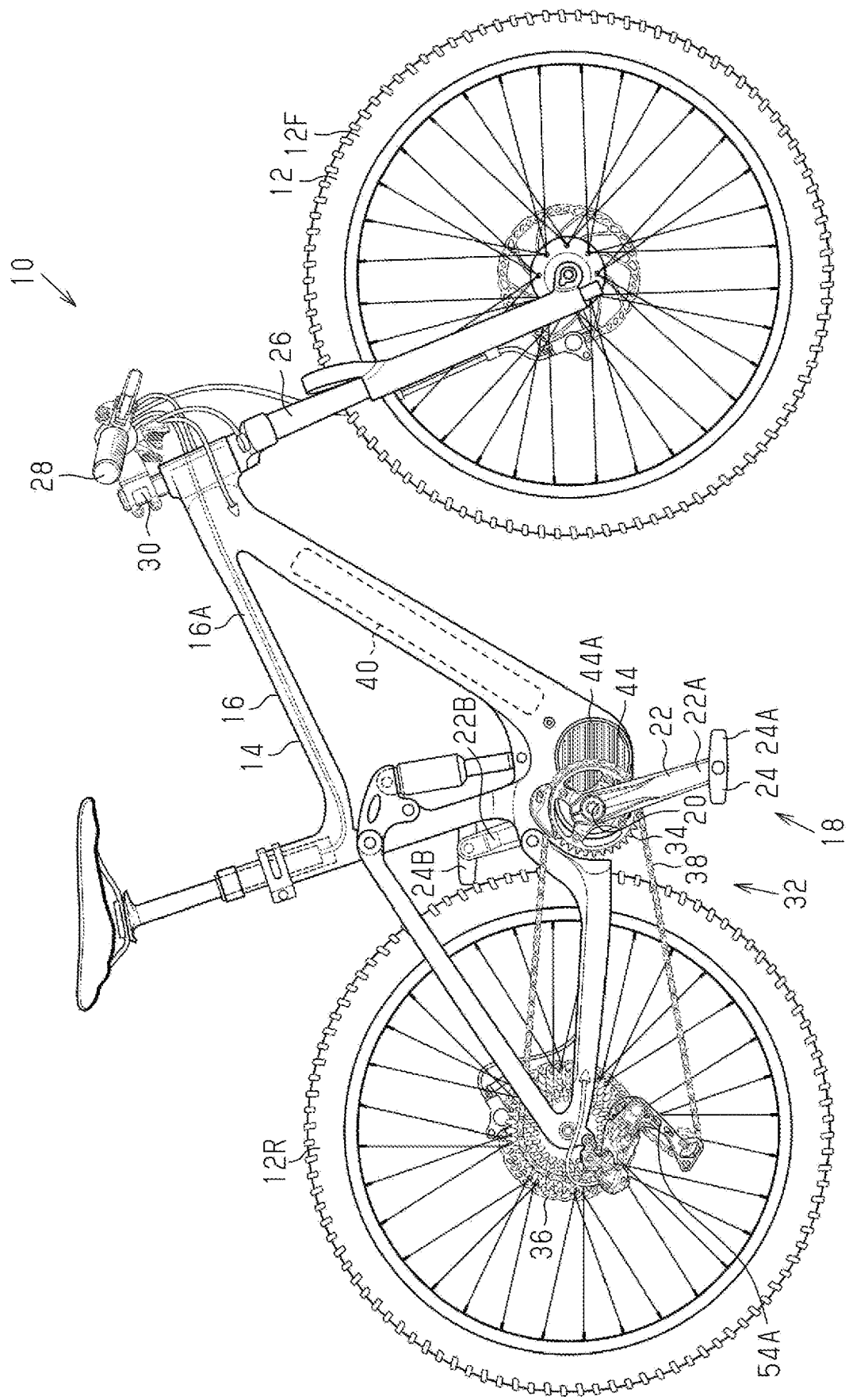
FIG. 1 is a side elevational view of a human-powered vehicle including a human-powered vehicle control system in accordance with an embodiment.

As shown in FIG. 1, a human-powered vehicle 10 is illustrated that is equipped with a human-powered vehicle control system 50 for a human-powered vehicle. The human-powered vehicle control system 50 will now be described with reference to FIGS. 1 to 8. The human-powered vehicle 10 is a vehicle that has at least one wheel and can be driven by at least a human driving force. Examples of the human-powered vehicle include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a drive force of an electric motor for propulsion in addition to the human driving force. The E-bike includes an electric assist bicycle that assists in propulsion with an electric motor. In the embodiment described hereafter, the human-powered vehicle 10 will be described as an electric assist bicycle.

The human-powered vehicle 10 includes, for example, at least one wheel 12 and a vehicle body 14. The at least one wheel 12 includes, for example, a front wheel 12F and a rear wheel 12R. The vehicle body 14 includes, for example, a frame 16. For example, a saddle is attached to the frame 16.

The human-powered vehicle 10 further includes, for example, a crank 18 to which human driving force is input. The crank 18 includes, for example, a crank axle 20 and crank arms 22. The crank axle 20 is rotatable relative to the frame 16. The crank arms 22 include, for example, a first crank arm 22A and a second crank arm 22B. For example, the first crank arm 22A and the second crank arm 22B are provided on opposite axial ends of the crank axle 20, respectively.

Pedals 24 are coupled to, for example, the crank arms 22. The pedals 24 include, for example, a first pedal 24A and a second pedal 24B. For example, the first pedal 24A is coupled to the first crank arm 22A. For example, the second pedal 24B is coupled to the second crank arm 22B. For example, a front fork 26 is connected to the frame 16. For example, the front wheel 12F is attached to the front fork 26. For example, a handlebar 28 is coupled to the front fork 26 via a stem 30. The rear wheel 12R is supported by, for example, the frame 16.

In the present embodiment, the crank 18 is connected to the rear wheel 12R by a drive mechanism 32. The rear wheel 12R is driven by, for example, the rotation of the crank axle 20. At least one of the front wheel 12F and the rear wheel 12R can be connected to the crank 18 by the drive mechanism 32. The drive mechanism 32 includes, for example, at least one first rotational body 34 coupled to the crank axle 20. The at least one first rotational body 34 includes, for example, a front sprocket. The at least one first rotational body 34 can include a pulley or a bevel gear. The crank axle 20 can be coupled to the front sprocket by a one-way clutch.

The drive mechanism 32 further includes, for example, at least one second rotational body 36 and a transmission body 38. For example, the transmission body 38 is configured to transmit the rotational force of the at least one first rotational body 34 to the at least one second rotational body 36. The transmission body 38 includes, for example, a chain. The transmission body 38 can include a belt or a shaft. The at least one second rotational body 36 includes, for example, a rear sprocket. The at least one second rotational body 36 can include a pulley or a bevel gear. For example, the chain is wound around the front sprocket and the rear sprocket. The at least one second rotational body 36 is coupled to, for example, the rear wheel 12R. For example, the rear wheel 12R is configured to rotate as the at least one second rotational body 36 rotates.

The human-powered vehicle 10 further includes, for example, a battery 40. The battery 40 includes one or more battery cells. Each battery cell includes a rechargeable battery. For example, the battery 40 is configured to supply electric power to a drive unit controller 44B, a first electronic controller 58, and a second electronic controller 64. For example, the battery 40 is connected to the drive unit controller 44B, the first electronic controller 58, and the electronic second controller 64 in a manner allowing for wired communication or wireless communication. The battery 40 is configured to perform communication with the drive unit controller 44B, the first electronic controller 58, and the second electronic controller 64 through, for example, power line communication (PLC), Controller Area Network (CAN), or universal asynchronous receiver-transmitter (UART). The terms "controller" and "electronic controller" as used herein refer to a hardware device or hardware devices that executes a software program, and does not include a human being. For simplicity, the first electronic controller 58 will be referred to as the first controller 58, and the second electronic controller 64 will be referred to as the second controller 64.

Figure 2:
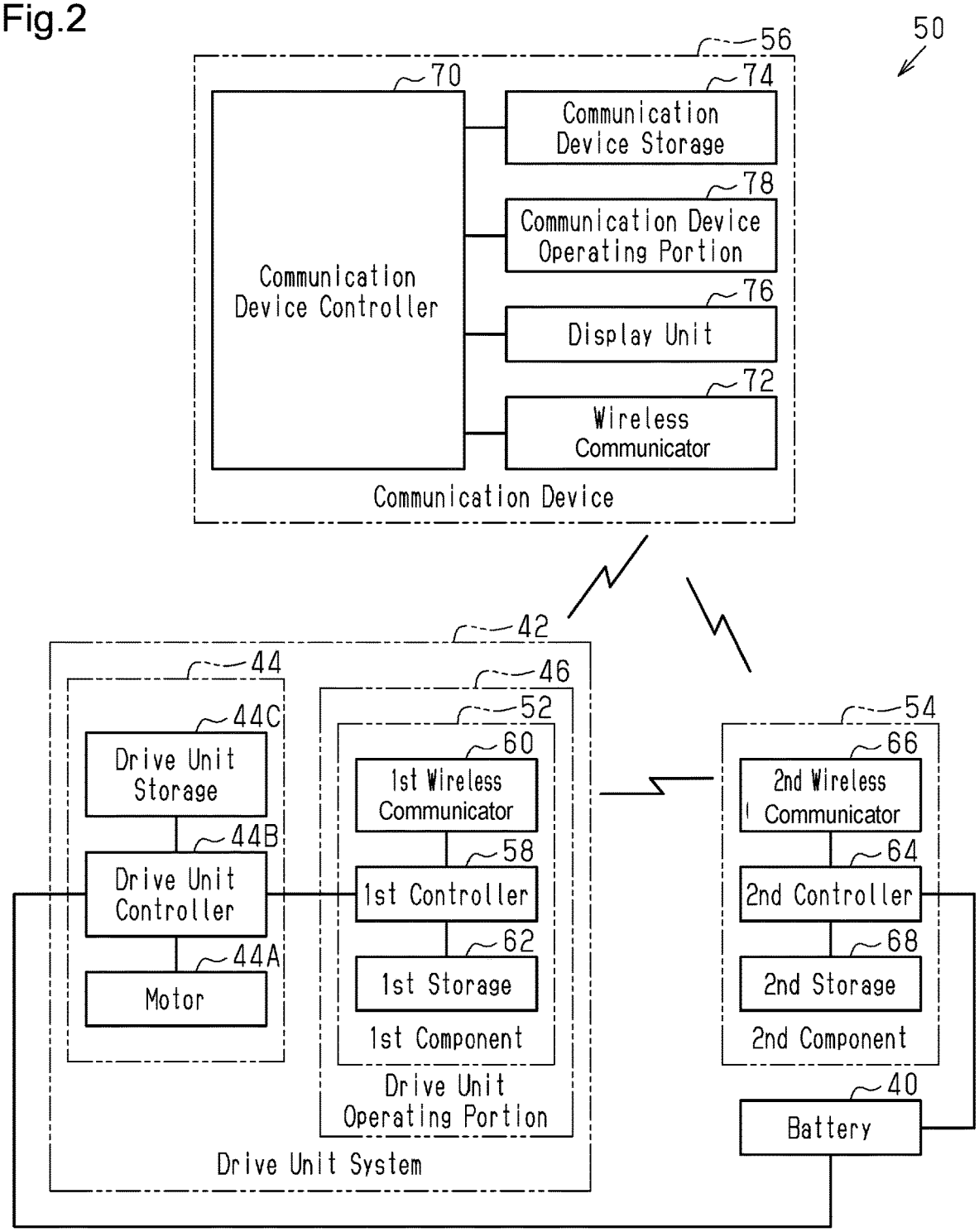
FIG. 2 is a block diagram showing the electrical configuration of the human-powered vehicle control system shown in FIG. 1.

As shown in FIG. 2, the human-powered vehicle 10 includes, for example, a drive unit system 42. The drive unit system 42 includes a drive unit 44 and a drive unit operating portion 46 configured to operate the drive unit 44.

The drive unit 44 includes, for example, a motor 44A configured to apply a propulsion force to the human-powered vehicle 10. For example, the motor 44A is configured to apply a propulsion force to the human-powered vehicle 10 in accordance with a human driving force. For example, the motor 44A is configured to transmit a rotational force to at least one of members included in a transmission path of the human driving force extending from the first pedal 24A and the second pedal 24B to the at least one second rotational body 36. For example, the motor 44A is provided on the frame 16, and is configured to transmit the rotational force to the at least one first rotational body 34. The motor 44A can be provided on a hub of the human-powered vehicle 10, and can be configured to transmit the rotational force to the at least one second rotational body 36.

The motor 44A includes, for example, one or more electric motors. The motor 44A includes, for example, a rotor and a stator. The motor 44A is, for example, an inner rotor type motor. The motor 44A can be an outer rotor type motor or an axial gap type motor.

The drive unit 44 further includes, for example, the drive unit controller 44B. The drive unit controller 44B includes, for example, at least one processor that execute predetermined control programs. The at least one processor includes, for example, a central processing unit (CPU) or a microprocessing unit (MPU). The drive unit controller 44B can include one or more microcomputers. The drive unit controller 44B can include multiple processors located at separate locations. For example, the drive unit controller 44B is connected to the first controller 58 in a manner allowing for wired communication or wireless communication. In a case where the drive unit controller 44B is connected to the first controller 58 through wired communication, the drive unit controller 44B is configured to perform communication with the first controller 58 through, for example, power line communication, CAN, or UART. For example, the drive unit controller 44B is configured to control the motor 44A.

The drive unit 44 further includes, for example, a drive unit storage 44C. The drive unit storage 44C stores, for example, control programs and information used for control processes. The drive unit storage 44C can be any computer storage device or any non-transitory computer-readable medium with the sole exception of a transitory, propagating signal. The drive unit storage 44C includes, for example, at least one of a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM). For example, the drive unit storage 44C is connected to the drive unit controller 44B in a manner allowing for wired communication or wireless communication.

The drive unit 44 further includes, for example, a drive unit housing. In the present embodiment, the motor 44A, the drive unit controller 44B, and the drive unit storage 44C are provided in the drive unit housing. For example, the drive unit controller 44B and the drive unit storage 44C are provided on an electric circuit board accommodated in the drive unit housing.

The drive unit operating portion 46 is, for example, formed separately from the drive unit 44. The drive unit operating portion 46 is provided, for example, at a position separated from the drive unit 44. The drive unit operating portion 46 includes, for example, a housing that is separate from the drive unit housing. The drive unit operating portion 46 is provided, for example, on the human-powered vehicle 10 at a location operable by the rider. The drive unit operating portion 46 is provided, for example, on the handlebar 28 or a top tube 16A of the frame 16. The drive unit operating portion 46 can be configured to operate a human-powered vehicle component other than the drive unit 44.

The drive unit 44 and the drive unit operating portion 46 are, for example, configured to perform wired communication. The drive unit 44 and the drive unit operating portion 46 can be configured to perform wireless communication. The electric power of the battery 40 is supplied to, for example, the drive unit 44. For example, the electric power of the battery 40 is supplied via the drive unit 44 to the drive unit operating portion 46.

The control system 50 for a human-powered vehicle includes a first component 52 and a second component 54. For example, the second component 54 is separate from the first component 52. The control system 50 includes, for example, the first component 52 and at least one second component 54 that differs from the first component 52. The first component 52 and the second component 54 are attachable to at least one of the human-powered vehicle 10 and the rider. In the present embodiment, the first component 52 is attachable to the human-powered vehicle 10. The first component 52 is attachable to, for example, the handlebar 28 or the top tube 16A of the frame 16.

The first component 52 is, for example, the drive unit 44 or the drive unit operating portion 46. In the present embodiment, the first component 52 is the drive unit operating portion 46. For example, the first component 52 receives electric power from the battery 40. The first component 52 can receive electric power from a battery that differs from the battery 40.

The second component 54 includes, for example, an electric transmission device 54A, an operating device for the electric transmission device 54A, the battery 40, a cycle computer, a suspension, an adjustable seatpost, a brake, an electric lock, a clock, or a heart rate monitor. In a case where the control system 50 includes a plurality of second components 54, the second components 54 include, for example, two or more of the electric transmission device 54A, the battery 40, a cycle computer, a suspension, an adjustable seatpost, a brake, an electric lock, a clock, and a heart rate monitor.

In the present embodiment, the second component 54 includes, for example, the electric transmission device 54A. For example, the electric transmission device 54A is configured to change a transmission ratio of the human-powered vehicle 10. The transmission ratio is, for example, a ratio of rotational speed of the wheel 12 to rotational speed of the crank 18. The electric transmission device 54A includes at least one of a front transmission and a rear transmission. The electric transmission device 54A can be a derailleur or an internal transmission device. In a case where the control system 50 includes a plurality of second components 54, the control system 50 can include two electric transmission devices 54A. The two electric transmission devices 54A are, for example, a front transmission and a rear transmission. The front transmission is, for example, a front derailleur. The rear transmission is, for example, a rear derailleur.

The electric lock is, for example, configured to restrict movement of the human-powered vehicle 10. For example, the electric lock is configured to be switchable between a restriction state that restricts relative movement of the frame 16 and at least one of the wheel 12, the crank 18, and the battery 40, and a permission state that permits relative movement of the frame 16 and the at least one of the wheel 12, the crank 18, and the battery 40. For example, the clock is attachable to the human-powered vehicle 10 or wearable by the rider. The clock can be a wristwatch-type portable information terminal. For example, the heart rate monitor is configured to be wearable by the rider or attachable to the human-powered vehicle 10 at a portion touched by the rider with his/her hand.

In a case where the second component 54 is attached to the human-powered vehicle 10, for example, the electric power of the battery 40 is supplied via the drive unit 44 to the second component 54. In a case where the second component 54 is attached to the human-powered vehicle 10, the electric power of the battery 40 can be supplied via the first component 52 to the second component 54. In a case where the second component 54 is attached to the human-powered vehicle 10, the second component 54 can receive electric power from a battery that differs from the battery 40. In a case where the second component 54 is worn by the rider, the second component 54 includes, for example, a battery that differs from the battery 40.

The control system 50 further includes a communication device 56. The term "communication device" as used herein refers to a hardware device or hardware devices, and does not include a human being. The first component 52 is configured to perform wireless communication with the communication device 56. The at least one second component 54 is configured to perform wireless communication with the communication device 56 and the first component 52.

The control system 50 is, for example, configured to pair the first component 52 with the second component 54 via the communication device 56. The term "pair" refers to, for example, a situation in which two components store the identification information of each other to perform mutual wireless communication. For example, in a case where a predetermined component is paired with another component, the predetermined component and the other component store the identification information of each other to perform mutual wireless communication. The identification information includes, for example, key information used for pairing components. The pairing of the first component 52 with the second component 54 is completed, for example, in a case where the first component stores second identification information of the second component 54 and the second component stores first identification information of the first component 52. After two components are paired, the components are configured to perform mutual communication using encrypted information. Even if the mutual communication is disconnected in a state in which two components are paired, in a case where the two components store the identification information of each other, the two components can resume the mutual communication using encrypted information.

In a case where the first component 52 is paired with the second component 54, for example, the first component 52 and the second component 54 store the identification information of each other to perform mutual wireless communication.

In an example, the first component 52 forms a single network group by pairing with the second component 54. For example, one of the first component 52 and the second component 54 acts as a master, and the other of the first component 52 and the second component 54 acts as a slave. In the present embodiment, the first component 52 acts as a master, and the second component 54 acts as a slave. A network group can be formed by a single first component 52 and multiple second components 54. In a case where a single first component 52 and multiple second components 54 form a network group, each of the second components 54 is paired with the first component 52. In the present embodiment, in a case where a single first component 52 and multiple second components 54 form a single network group, the first component 52 acts as a master and each of the second components 54 acts as a slave.

The first component 52 is, for example, configured to be pairable with the communication device 56. In a case where the first component 52 is paired with the communication device 56, for example, the first component 52 and the communication device 56 store the identification information of each other to perform mutual wireless communication. For example, the first component 52 forms a single network group by pairing with the communication device 56. For example, one of the first component 52 and the communication device 56 acts as a master, and the other of the first component 52 and the communication device 56 acts as a slave. In the present embodiment, the communication device 56 acts as a master, and the first component 52 acts as a slave.

The second component 54 and the communication device 56 are, for example, configured to perform communication without pairing with each other. The second component 54 can be configured to be pairable with the communication device 56. In a case where the second component 54 is paired with the communication device 56, for example, the second component 54 and the communication device 56 store the identification information of each other to perform mutual wireless communication. In a case where the second component 54 is paired with the communication device 56, for example, the second component 54 forms a single network group by pairing with the communication device 56. In a case where the second component 54 is paired with the communication device 56, for example, one of the second component 54 and the communication device 56 acts as a master, and the other of the second component 54 and the communication device 56 acts as a slave. In a case where the second component 54 is paired with the communication device 56, for example, the communication device 56 acts as a master, and the second component 54 acts as a slave.

The first component 52 includes the first controller 58, a first wireless communicator 60, and a first storage 62. The first controller 58 includes, for example, at least one processor that executes predetermined control programs. The at least one processor includes, for example, a CPU or an MPU. The first controller 58 can include one or more microcomputers. The first controller 58 can include multiple processors located at separate positions. For example, the first controller 58 is configured to perform wired communication or wireless communication with the drive unit controller 44B.

The first wireless communicator 60 is, for example, connected to the first controller 58 in a manner allowing for wired communication or wireless communication. For example, the first controller 58 is configured to control the first wireless communicator 60. The first wireless communicator 60 is configured to perform wireless communication using, for example, at least one of Bluetooth®, ANT+®, Wi-Fi®, infrared communication, the third-generation mobile communication system, the fourth-generation mobile communication system, and the fifth-generation mobile communication system. The first wireless communicator 60 can perform wireless communication through a communication protocol other than Bluetooth®, ANT+®, Wi-Fi®, infrared communication, the third-generation mobile communication system, the fourth-generation mobile communication system, and the fifth-generation mobile communication system. The first wireless communicator 60 can be configured to perform wireless communication with each of the second component 54 and the communication device 56 through different communication protocols.

The first storage 62 stores, for example, control programs and information used for control processes. The first storage 62 can be any computer storage device or any non-transitory computer-readable medium with the sole exception of a transitory, propagating signal. The first storage 62 includes, for example, at least one of a non-volatile memory and a volatile memory. The non-volatile memory includes, for example, at least one of a ROM, an EPROM, an EEPROM, and a flash memory. The volatile memory includes, for example, a RAM. For example, the first storage 62 is connected to the first controller 58 in a manner allowing for wired communication or wireless communication.

The first storage 62 is configured to store the first identification information of the first component 52 and the second identification information of the second component 54. For example, before the first component 52 is paired with the second component 54, the first storage 62 stores the first identification information and does not store the second identification information. In a case where the first component 52 is not paired with the second component 54, for example, the first storage 62 stores the first identification information and does not store the second identification information. For example, after the first component 52 is paired with the second component 54, the first storage 62 stores both the first identification information and the second identification information.

The second component 54 includes the second controller 64, a second wireless communicator 66, and a second storage 68. The second controller 64 includes, for example, at least one processor that executes predetermined control programs. The at least one processor includes, for example, a CPU or an MPU. The second controller 64 can include one or more microcomputers. The second controller 64 can include multiple processors located at separate positions.

The second wireless communicator 66 is, for example, connected to the second controller 64 in a manner allowing for wired communication or wireless communication. For example, the second controller 64 is configured to control the second wireless communicator 66. For example, the second controller 64 is configured to control the second wireless communicator 66 so that the second wireless communicator 66 performs broadcast communication, or multicast of a communication signal.

The second wireless communicator 66 is configured to perform wireless communication using, for example, at least one of Bluetooth®, ANT+®, Wi-Fi®, infrared communication, the third-generation mobile communication system, the fourth-generation mobile communication system, and the fifth-generation mobile communication system. The second wireless communicator 66 can perform wireless communication through a communication protocol other than Bluetooth®, ANT+®, Wi-Fi®, infrared communication, the third-generation mobile communication system, the fourth-generation mobile communication system, and the fifth-generation mobile communication system.

The second storage 68 stores, for example, control programs and information used for control processes. The second storage 68 can be any computer storage device or any non-transitory computer-readable medium with the sole exception of a transitory, propagating signal. The second storage 68 includes, for example, at least one of a non-volatile memory and a volatile memory. The non-volatile memory includes, for example, at least one of a ROM, an EPROM, an EEPROM, and a flash memory. The volatile memory includes, for example, a RAM. For example, the second storage 68 is connected to the second controller 64 in a manner allowing for wired communication or wireless communication.

The second storage 68 is configured to store first identification information and second identification information. For example, before the second component 54 is paired with the first component 52, the second storage 68 stores the second identification information and does not store the first identification information. In a case where the second component 54 is not paired with the first component 52, for example, the second storage 68 stores the second identification information and does not store the first identification information. For example, after the second component 54 is paired with the first component 52, the second storage 68 stores both the first identification information and the second identification information.

In an example, the communication device 56 is not coupled to the human-powered vehicle 10. For example, the communication device 56 is a portable devoice that is configured to be carried by a user. The communication device 56 includes, for example, at least one of a smartphone, a tablet-type personal computer, a cycle computer, a personal computer, a wristwatch-type portable information terminal, and a portable electronic device. In the present embodiment, the communication device 56 includes a smartphone.

The communication device 56 includes a communication device controller 70 and a wireless communicator 72. The communication device controller 70 includes, for example, at least one processor that executes predetermined control programs. The at least one processor includes, for example, a CPU or an MPU. The communication device controller 70 can include one or more microcomputers. The communication device controller 70 can include multiple processors located at separate positions.

The communication device controller 70 is configured to control the wireless communicator 72. For example, the wireless communicator 72 is connected to the communication device controller 70 in a manner allowing for wired communication or wireless communication. For example, the communication device controller 70 is configured to control the wireless communicator 72 so that the wireless communicator 72 performs communication with the first component 52 in a case where the communication device 56 is paired with the first component 52 in advance. For example, the communication device controller 70 is configured to control the wireless communicator 72 so that the wireless communicator 72 performs communication with the second component 54 in a case where the communication device 56 is paired with the second component 54 in advance.

The wireless communicator 72 is configured to perform wireless communication using, for example, at least one of Bluetooth®, ANT+®, Wi-Fi®, infrared communication, the third-generation mobile communication system, the fourth-generation mobile communication system, and the fifth-generation mobile communication system. The wireless communicator 72 can perform wireless communication through a communication protocol other than Bluetooth®, ANT+®, Wi-Fi®, infrared communication, the third-generation mobile communication system, the fourth-generation mobile communication system, and the fifth-generation mobile communication system.

The wireless communicator 72 can be configured to perform wireless communication with the first component 52 and the second component 54 through different communication protocols. In this case, the communication device 56 is, for example, configured to be paired with one or more of the at least one second component 54 in a state in which the communication device 56 is paired with the first component 52.

The communication device 56 further includes communication device storage 74. The communication device storage 74 stores, for example, control programs and information used for control processes. The communication device storage 74 can be any computer storage device or any non-transitory computer-readable medium with the sole exception of a transitory, propagating signal. The communication device storage 74 includes, for example, at least one of a non-volatile memory and a volatile memory. The non-volatile memory includes, for example, at least one of a ROM, an EPROM, an EEPROM, and a flash memory. The volatile memory includes, for example, a RAM. For example, the communication device storage 74 is connected to the communication device controller 70 in a manner allowing for wired communication or wireless communication. The communication device storage 74 is configured to store the first identification information of the first component 52 and the second identification information of the second component 54.

The communication device storage 74 is, for example, configured to store first information. The first information includes, for example, a program related to the first component 52. The communication device controller 70 obtains the first information, for example, via the internet. The first information includes, for example, a program for pairing the first component 52 with the second component 54. The first information can include a program for setting the first component 52.

The communication device storage 74 is, for example, configured to store second information. The second information includes, for example, a program related to the second component 54. The communication device controller 70 obtains the second information, for example, via the internet. The second information includes, for example, a program for setting the second component 54.

The communication device 56 further includes a display unit 76. The display unit 76 includes a screen 76A. The screen 76A includes, for example, a liquid crystal display, a segment display, or an organic light emitting diode (OLED) display.

The communication device 56 further includes, for example, a communication device operating portion 78. The communication device operating portion 78 includes, for example, a touch panel. In a case where the communication device operating portion 78 includes a touch panel, for example, the communication device operating portion 78 is integrated into the display unit 76. The communication device operating portion 78 can include a button, a dial, or a control stick. The communication device operating portion 78 can include an instrument other than a touch panel, a button, a dial, and a control stick as long as the content shown on the screen 76A can be selected.

The communication device 56 further includes, for example, a communication device battery that differs from the battery 40. The communication device includes one or more battery cells. Each battery cell includes a rechargeable battery. For example, the communication device battery is configured to supply electric power to the communication device controller 70. For example, the communication device battery is connected to the communication device controller 70 in a manner allowing for wired communication or wireless communication. The communication device battery is configured to perform communication with the communication device controller 70 through, for example, power line communication, CAN, or UART.

The first component 52 is configured to be paired with the second component 54 via the communication device 56. For example, the first component 52 is configured to be paired with the second component 54 in a state in which the communication device 56 is paired with the first component 52. The first component 52 can be configured to be paired with the second component 54 in a state in which the communication device 56 is not paired with the first component 52. In a case where the first component 52 is configured to be paired with the second component 54 in a state in which the communication device 56 is not paired with the first component 52, the communication device 56 and the first component 52 are configured to perform communication with each other through, for example, broadcast communication.

In a case where the control system 50 includes the at least one second component 54, for example, the first component 52 is configured to be paired with one or more of the at least one second component 54 in a state in which the communication device 56 is paired with the first component 52.

The second controller 64 is configured to control the second wireless communicator 66 so that the second wireless communicator 66 transmits the second identification information stored in the second storage 68 to the communication device 56. The first controller 58 is configured to control the first wireless communicator 60 so that the first wireless communicator 60 transmits the first identification information stored in the first storage 62 to the second component 54 in response to receipt of the second identification information by the first wireless communicator 60 from the communication device 56. The second controller 64 is configured to control the second storage 68 so that the second storage 68 stores the first identification information in response to receipt of the first identification information by the second wireless communicator 66 from the first component 52. For example, the first controller 58 is configured to control the first storage 62 so that the first storage 62 stores the second identification information obtained from the communication device 56 through wireless communication. For example, the first controller 58 is configured to control the first storage 62 so that the first storage 62 stores the second identification information in response to receipt of the second identification information by the first wireless communicator 60 from the communication device 56. The pairing of the first component 52 with the second component 54 is completed in a case where the second storage 68 stores the first identification information and the first storage 62 stores the second identification information.

The second controller 64 is, for example, configured to control the second wireless communicator 66 so that the second wireless communicator 66 continuously or intermittently transmits the second identification information to the communication device 56. For example, the second controller 64 is configured to control the second wireless communicator 66 so that the second wireless communicator 66 transmits the second identification information and appendix information that is appended to the second identification information to the communication device 56.

The second controller 64 is, for example, configured to control the second wireless communicator 66 so that the second wireless communicator 66 transmits the second identification information to the first component 52. For example, the second controller 64 is configured to control the second wireless communicator 66 so the second wireless communicator 66 continuously or intermittently transmits the second identification information to the first component 52. For example, the second controller 64 is configured to control the second wireless communicator 66 so that the second wireless communicator 66 transmits the appendix information that is appended to the second identification information to the first component 52. The appendix information includes, for example, at least one of the type, serial number, model, and icon of the second component 54. For example, the second controller 64 is configured to control the second wireless communicator 66 so that the second wireless communicator 66 transmits the second identification information and the appendix information that is appended to the second identification information to the first component 52.

The second controller 64 is, for example, configured to control the second wireless communicator 66 so that the second wireless communicator 66 transmits the second identification information and the appendix information through broadcast communication. For example, the second controller 64 is configured to control the second wireless communicator 66 so that the second wireless communicator 66 transmits the second identification information and the appendix information to the communication device 56 and the first component 52 through broadcast communication.

In an example, the second controller 64 is configured to control the second wireless communicator 66 so that the second wireless communicator 66 transmits the second identification information and the appendix information through broadcast communication in a case where a condition for starting transmission of the second identification information is satisfied. The condition for starting transmission of the second identification information is satisfied, for example, in a case where the second component 54 is turned to the ON state. The condition for starting transmission of the second identification information is satisfied, for example, in a case where an operation portion provided on the second component 54 is operated. The condition for starting transmission of the second identification information can be configured not to be satisfied, for example, in a case where the pairing of the first component 52 with the second component 54 has been completed.

The second controller 64 is, for example, configured to control the second wireless communicator 66 so that the second wireless communicator 66 stops the transmission of the second identification information upon receipt of the first identification information. For example, the second controller 64 is configured to control the second wireless communicator 66 so that the second wireless communicator 66 stops the transmission of the second identification information and the appendix information through broadcast communication in a case where a condition for stopping transmission of the second identification information is satisfied. The condition for stopping transmission of the second identification information is satisfied, for example, in a case where the pairing of the second component 54 with the first component 52 is completed. The condition for stopping transmission of the second identification information is satisfied, for example, in a case where the second component 54 is turned to the OFF state. The condition for stopping transmission of the second identification information is satisfied, for example, in a case where a predetermined period elapses from a point of time at which the condition for starting transmission of the second identification information was satisfied. The condition for stopping transmission of the second identification information is satisfied, for example, in a case where an operation portion provided on the second component 54 is operated. The condition for stopping transmission of the second identification information is satisfied, for example, upon receipt of a request for stopping transmission of the second identification information from at least one of the first component 52 and the communication device 56.

The communication device 56 is, for example, configured to receive the second identification information in a state in which a program based on the first information is activated. For example, the communication device 56 is configured to receive the second identification information and the appendix information in a state in which the program based on the first information is activated. For example, the communication device controller 70 is configured to control the display unit 76 so that the display unit 76 displays relevant information related to the second component 54 upon receipt of the second identification information. The relevant information includes, for example, at least one of the type, serial number, model, identification information, and icon of the second component 54.

In an example, the communication device controller 70 controls the display unit 76 so that the display unit 76 displays the relevant information related to the second component 54, which corresponds to the second identification information stored in the communication device storage 74. For example, in a case where the communication device controller 70 receives the second identification information and temporarily stores the second identification information in the communication device storage 74, the communication device controller 70 controls the display unit 76 to display the relevant information related to the second component 54, which corresponds to the stored second identification information. For example, the communication device controller 70 is configured to control the display unit 76 so that the display unit 76 displays the relevant information related to the second component 54 using the program based on the first information. The relevant information includes, for example, at least one of the second identification information and the appendix information that is appended to the second identification information. The appendix information includes, for example, information other than the second identification information in the relevant information.

In a case where the at least one second component 54 includes a plurality of second components 54 configured to be paired with the first component 52, the screen 76A is configured to show the relevant information related to at least one pairing candidate among the second components 54. This allows a user to check the screen 76A and recognize the at least one pairing candidate among the second components 54 configured to be paired with the first component 52.

The at least one pairing candidate among the second components 54 can be at least one second component 54 having the second identification information that is stored in the communication device storage 74. The second component 54 having the second identification information that is stored in the communication device storage 74 corresponds to, for example, the second component 54 that is paired with the communication device 56 in advance. The at least one pairing candidate among the second components 54 can be the second component 54 that continuously or intermittently transmits the second identification information. The second component 54 that continuously or intermittently transmits the second identification information corresponds to, for example, the second component 54 that transmits the second identification information through broadcast communication. The at least one pairing candidate among the second components 54 can be at least one second component 54 that is ready to be paired with the first component 52. A state in which the second component 54 is ready for pairing refers to, for example, a state in which the second component 54 can receive identification information of another device.

The screen 76A is, for example, configured to show at least one image P. In the present embodiment, the at least one image P corresponds to the relevant information related to the at least one pairing candidate among the second components 54. The at least one image P includes, for example, at least one of text, a numeral, and an icon. For example, the image P is an image that allows a user to recognize the second component 54 that corresponds to the image P. For example, the image P is stored in the communication device storage 74 in advance. The image P can be configured to be obtainable via the internet.

In a case where the at least one second component 54 includes a plurality of second components 54, for example, the at least one image P includes a plurality of images P. The images P include, for example, at least one of text, a numeral, and an icon that indicates the relevant information of the second components 54. In a case where a plurality of second components 54 can be paired with the first component 52, for example, the screen 76A is configured to show a list of one or more pairing candidates among the second components 54. In a case where a plurality of second components 54 can be paired with the first component 52, the screen 76A can be configured to switch the pairing candidate second components 54, at least one of which is shown, one by one.

Figure 3:
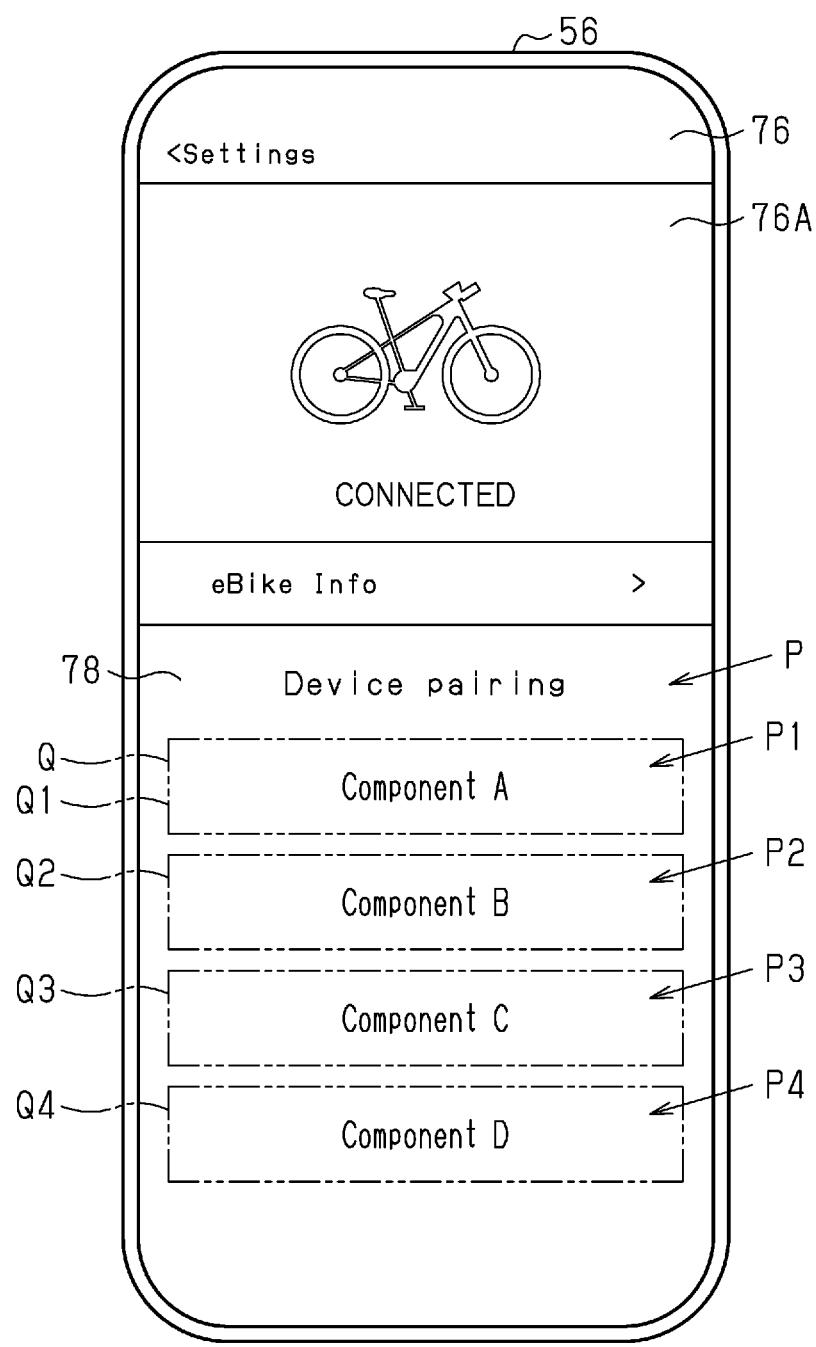
FIG. 3 is a schematic diagram showing an example of contents shown on a display unit of a communication device shown in FIG. 2.

As shown in FIG. 3, the screen 76A includes, for example, at least one region Q where the relevant information is shown. In a case where the at least one second component 54 includes a plurality of second components 54, for example, the at least one region Q includes a plurality of regions Q. For example, each region Q shows the image P that corresponds to the relevant information related to a corresponding one of the second components 54.

In a case where four second components 54 can be paired with the first component 52, the regions Q include, for example, a first region Q1, a second region Q2, a third region Q3, and a fourth region Q4. For example, in a case where four second components 54 can be paired with the first component 52, for example, the screen 76A shows a first image P1, a second image P2, a third image P3, and a fourth image P4. The first image P1, the second image P2, the third image P3, and the fourth image P4 each correspond to one second component 54. The first region Q1 shows, for example, the first image P1. The second region Q2 shows, for example, the second image P2. The third region Q3 shows, for example, the third image P3. The fourth region Q4 shows, for example, the fourth image P4.

The display unit 76 can be configured to display whether the first component 52 and the communication device 56 are performing mutual communication in a paired state. In a case where the first component 52 and the communication device 56 are performing mutual communication in a paired state, for example, the communication device controller 70 controls the display unit 76 so that the screen 76A shows a first predetermined image indicating the state in which the first component 52 and the communication device 56 are performing mutual communication. In a case where mutual communication in a paired state is not performed by the first component 52 and the communication device 56, for example, the communication device controller 70 controls the display unit 76 so that the screen 76A shows a second predetermined image indicating the state in which the first component 52 and the communication device 56 are not performing mutual communication. Alternatively, the communication device controller 70 controls the display unit 76 so that the screen 76A does not show the first predetermined image.

The first predetermined image includes, for example, at least one of text, a numeral, and an icon indicating a state in which the first component 52 and the communication device 56 are performing mutual communication in a paired state. The first predetermined image includes, for example, text such as "CONNECTED" as shown in FIG. 3. The second predetermined image includes, for example, at least one of text, a numeral, and an icon indicating a state in which mutual communication in a paired state is not performed by the first component 52 and the communication device 56. The second predetermined image includes, for example, text such as "DISCONNECTED".

The communication device controller 70 is, for example, configured to control the wireless communicator 72 so that the wireless communicator 72 transmits the second identification information to the first component 52 in response to receipt of the second identification information from the second component 54 through wireless communication. For example, the communication device controller 70 is configured to control the wireless communicator 72 so that the wireless communicator 72 transmits the second identification information to the first component 52 and does not transmit the appendix information to the first component 52. For example, the communication device controller 70 can control the communication device storage 74 so that the communication device storage 74 temporarily stores the second identification information upon receipt of the second identification information and deletes the second identification information upon transmission of the second identification information to the first component 52.

The communication device controller 70 is, for example, configured to control the wireless communicator 72 so that the wireless communicator 72 transmits the second identification information to the first component 52 in response to selection of the second component 54 by a user through the communication device operating portion 78. For example, in a case where the user operates the communication device operating portion 78 and selects one of the at least one image P shown on the screen 76A, the communication device controller 70 is configured to control the wireless communicator 72 so that the wireless communicator 72 transmits the second identification information of the second component 54 corresponding to the selected image P to the first component 52.

In an example, in response to selection of one or more of the at least one second component 54 by the user through the communication device operating portion 78, the communication device controller 70 is configured to pair the first component 52 with the selected one or more of the at least one second component 54. A process for pairing is executed between the first component 52 and the selected one or more second components 54 in a case where the communication device controller 70 transmits the second identification information of the selected one or more second components 54 to the first component 52.

In a case where a plurality of second components 54 is pairable with the first component 52, the communication device controller 70 can be configured to allow the user to select only one of the second components 54 through the communication device operating portion 78. In a case where the communication device controller 70 is configured to allow the user to select two or more of the second components 54 through the communication device operating portion 78, the communication device controller 70 can transmit the second identification information of the second components 54 to the first component 52 in a continuous manner. In a case where the first component 52 receives the second identification information of the second components 54, for example, the first component 52 is configured to be paired with each one of the second components 54.

In an example, in a case where the manufacturer of the at least one second component 54 differs from a predetermined manufacturer, the communication device controller 70 is configured to control the display unit 76 so that the display unit 76 does not display the information related to the at least one second component 54. For example, in a case where the manufacturer of the at least one second component 54 that is received through broadcast communication differs from the predetermined manufacturer, the communication device controller 70 is configured to control the display unit 76 so that the display unit 76 does not display the information related to the at least one second component 54. For example, the communication device controller 70 is configured to determine whether the manufacturer of the at least one second component 54 is the predetermined manufacturer based on the appendix information transmitted from the at least one second component 54.

The communication device controller 70 is, for example, configured to start a selection mode in a case where the user operates the communication device operating portion 78 to start the selected mode. For example, the selection mode is set by a program included in the first information. In a case where the selection mode is started, for example, the communication device controller 70 shifts to a setting mode in which the communication device 56 is paired with the first component 52. For example, the communication device controller 70 is configured to end the selection mode in a case where the user operates the communication device operating portion 78 to end the selection mode. In a case where the selection mode is ended, for example, the communication device controller 70 shifts to a predetermined mode that differs from the setting mode in which the first component 52 is paired with the communication device 56, and/or ends an application for selecting the at least one second component 54.

In a case where a condition for disconnecting the mutual communication between the first component 52 and the communication device 56 in a paired state is satisfied, for example, the communication device controller 70 is configured to disconnect the mutual communication between the first component 52 and the communication device 56 in a paired state. The condition for disconnecting the mutual communication between the first component 52 and the communication device 56 in a paired state is satisfied, for example, in a case where the application for selecting the at least one second component 54 is ended. The condition for disconnecting the mutual communication between the first component 52 and the communication device 56 in a paired state can be satisfied in a case where the first component 52 or the communication device 56 is turned to the OFF state. Alternatively, the condition for disconnecting the mutual communication between the first component 52 and the communication device 56 in a paired state can be satisfied in a case where the mutual communication between the first component 52 and the communication device 56 in a paired state is disconnected by the user through operation of an operating portion on the first component 52.

The first controller 58 is, for example, configured to detect disconnection of the mutual communication between the first component 52 and the communication device 56 in a paired state. The first controller 58 detects disconnection of the mutual communication in a paired state, for example, in a case where the first controller 58 cannot establish wireless communication with the communication device 56. The first controller 58 can detect disconnection of the mutual communication in a paired state in a case where the first controller 58 receives a disconnection notification of the mutual communication in a paired state from the communication device 56. In a case where the first controller 58 receives a disconnection notification of the mutual communication in a paired state from the communication device 56, for example, the communication device controller 70 is configured to transmit the disconnection notification of the mutual communication in a paired state to the first component 52 and then disconnects the mutual communication between the first component 52 and the communication device 56 in a paired state.

The first controller 58 is, for example, configured to compare the second identification information received from the second component 54 with the second identification information received from the communication device 56. For example, the first controller 58 is configured to compare the second identification information received from the second component 54 with the second identification information received from the communication device 56 and stored in the first storage 62. For example, the first controller 58 is configured to compare the second identification information received from the second component 54 through broadcast communication with the second identification information received from the communication device 56 and stored in the first storage 62. For example, the first controller 58 is configured to store the appendix information received from the second component 54 to the first storage 62 in a case where the second identification information received from the second component 54 matches the second identification information received from the communication device 56.

Figure 4:
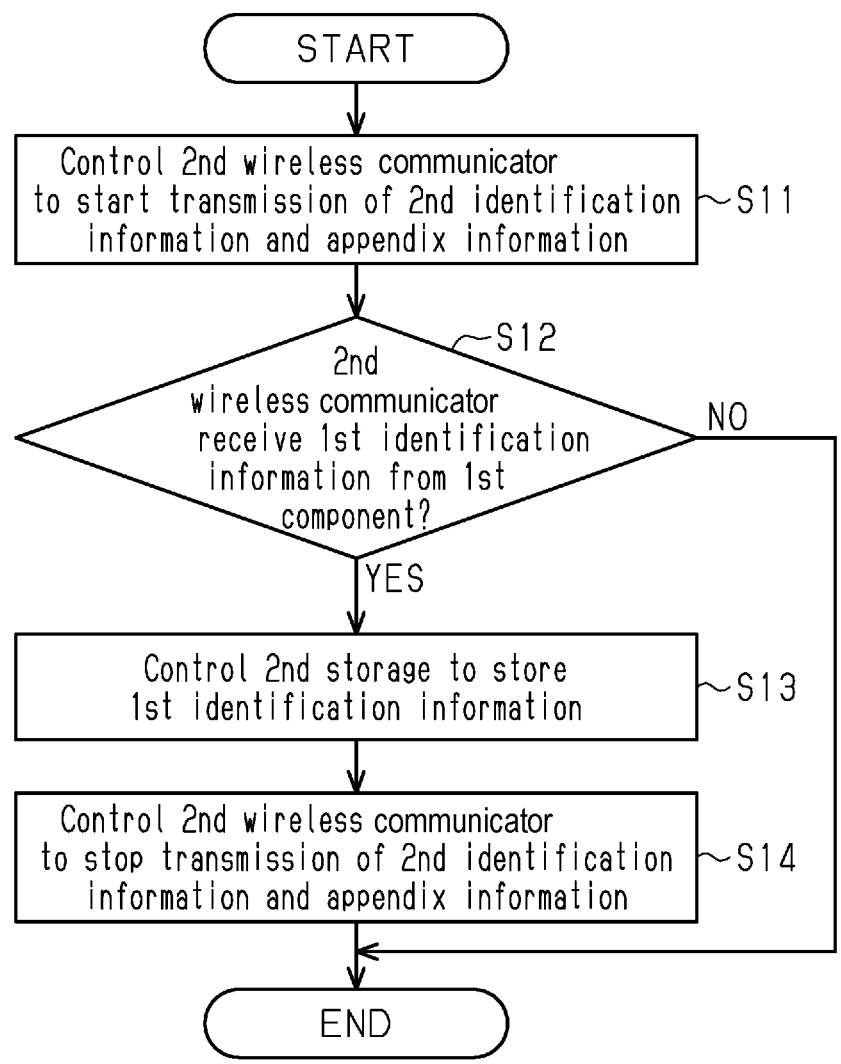
FIG. 4 is a flowchart illustrating a process executed by a second electronic controller shown in FIG. 2.

A process executed by the second controller 64 to control the second wireless communicator 66 and the second storage 68 will now be described with reference to FIG. 4. For example, in a case where the condition for starting transmission of the second identification information is satisfied, the second controller 64 starts the process of the flowchart shown in FIG. 4 from step S11. In a case where the process of the flowchart shown in FIG. 4 ends, for example, the second controller 64 repeats the process from step S11 in FIG. 4 if the condition for starting transmission of the second identification information is satisfied again.

In step S11, the second controller 64 controls the second wireless communicator 66 so that the second wireless communicator 66 starts transmission of the second identification information and the appendix information. Then, the second controller 64 proceeds to step S12. For example, the second controller 64 controls the second wireless communicator 66 in step S11 so that the second wireless communicator 66 starts transmission of the second identification information and the appendix information through broadcast communication. The second controller 64 can control the second wireless communicator 66 in step S11 so that the second wireless communicator 66 starts transmission of only the second identification information through broadcast communication.

In step S12, the second controller 64 determines whether the second wireless communicator 66 receives the first identification information from the first component 52. In a case where the second wireless communicator 66 has received the first identification information from the first component 52, the second controller 64 proceeds to step S13. In a case where the second wireless communicator 66 does not receive the first identification information from the first component 52, the second controller 64 ends processing. The second controller 64 can repeat step S12 in predetermined cycles until a predetermined period elapses from a point of time at which the condition for starting transmission of the second identification information was satisfied. In a case where the second wireless communicator 66 has not received the first identification information from the first component 52 even if the predetermined period elapses from a point of time at which the condition for starting transmission of the second identification information was satisfied, the second controller 64 can end processing.

In step S13, the second controller 64 stores the first identification information to the second storage 68, and then proceeds to step S14. In step S14, the second controller 64 controls the second wireless communicator 66 so that the second wireless communicator 66 stops transmission of the second identification information and the appendix information.

A process executed by the communication device controller 70 to control the wireless communicator 72, the communication device storage 74, and the display unit 76 will now be described with reference to FIG. 5. For example, in a case where the program included in the first information is activated, the communication device controller 70 starts the process of the flowchart shown in FIG. 5 from step S21. In a case where the process of the flowchart shown in FIG. 5 ends, for example, the communication device controller 70 repeats the process from step S21 of FIG. 5 in predetermined cycles until the program included in the first information ends.

In step S21, the communication device controller 70 determines whether to start the selection mode. In a case where the communication device controller 70 starts the selection mode, the communication device controller 70 proceeds to step S22. In a case where the selection mode is started, for example, the screen 76A of the display unit 76 shifts to the screen 76A shown in FIG. 3.

In a case where the communication device controller 70 ends the selection mode, the communication device controller 70 ends processing. In step S22, the communication device controller 70 determines whether the first component 52 is paired with the communication device 56. The communication device controller 70 determines that the first component 52 is paired with the communication device 56, for example, in a case where the communication device storage 74 stores the first identification information and the first component 52 stores the identification information of the communication device 56. In a case where the first component 52 is not paired with the communication device 56, the communication device controller 70 ends processing. In a case where the first component 52 is paired with the communication device 56, the communication device controller 70 proceeds to step S23. The communication device controller 70 can execute step S23 after step S21, and then execute step S22 after step S23. The communication device controller 70 can be configured not to start the selection mode in a case where the first component 52 is not paired with the communication device 56.

From at least step S22, the communication device 56 performs mutual communication with the first component 52 in the paired state. In a case where the first component 52 is paired with the communication device 56, the communication device 56 can perform mutual communication with the first component 52 in the paired state from at least step S21. The communication device controller 70 can determine whether the communication device 56 is performing mutual communication with the first component 52 in a paired state in step S22. From step S22, the communication device controller 70 proceeds the process, for example, in a state in which the first predetermined image is shown on the screen 76A.

In step S23, the communication device controller 70 determines whether the wireless communicator 72 receives the second identification information and the appendix information from the second component 54. The communication device controller 70 determines that the wireless communicator 72 has received the second identification information and the appendix information from the second component 54, for example, in a case where the wireless communicator 72 receives the second identification information and the appendix information from the second component 54 through broadcast communication. In a case where the wireless communicator 72 receives the second identification information and the appendix information from the second component 54, the communication device controller 70 proceeds to step S24. In a case where the wireless communicator 72 does not receive the second identification information and the appendix information from the second component 54, the communication device controller 70 ends processing.

In step S24, the communication device controller 70 displays the relevant information related to the second component 54 on the display unit 76, and then proceeds to step S25. For example, as shown in FIG. 3, the communication device controller 70 shows on the screen 76A the images P which respectively correspond to the second components 54 associated with the received second identification information. The communication device controller 70 can show on the screen 76A the image P which corresponds to at least one pairing candidate among a plurality of second components 54.

In step S25, the communication device controller 70 determines whether the second component 54 is selected by the user through operation of the communication device operating portion 78. For example, in a case where the screen 76A shows multiple images P corresponding to a plurality of second components 54, and the user operates the communication device operating portion 78 to select one or more second components 54, the communication device controller 70 determines that the one or more second components 54 are selected by the user through operation of the communication device operating portion 78. For example, in a case where the screen 76A shows an image P corresponding to one second component 54, and the user operates the communication device operating portion 78 to select the second component 54, the communication device controller 70 determines that the second component 54 is selected by the user through operation of the communication device operating portion 78. In a case where the second component 54 is not selected by the user through operation of the communication device operating portion 78, the communication device controller 70 proceeds to step S26.

In step S26, the communication device controller 70 determines whether the selection mode is ended. In a case where the selection mode has ended, the communication device controller 70 ends processing. In a case where the selection mode is not ended, the communication device controller 70 returns to step S25. In a case where the second component 54 is selected by the user through operation of the communication device operating portion 78 in step S25, the communication device controller 70 proceeds to step S27. In step S27, the communication device controller 70 controls the wireless communicator 72 so that the wireless communicator 72 transmits the second identification information to the first wireless communicator 60. Then, the communication device controller 70 proceeds to step S28.

In step S28, the communication device controller 70 determines whether the communication device operating portion 78 is operated by the user to disconnect the mutual communication between the first component 52 and the communication device 56 in the paired state. In a case where the user does not operate the communication device operating portion 78 to disconnect the mutual communication between the first component 52 and the communication device 56 in the paired state, the communication device controller 70 proceeds to step S29.

In step S29, the communication device controller 70 determines whether the condition for disconnecting the mutual communication between the first component 52 and the communication device 56 in the paired state is satisfied. In a case where the condition for disconnecting the mutual communication between the first component 52 and the communication device 56 in the paired state is not satisfied, the communication device controller 70 returns to step S28. In a case where the condition for disconnecting the mutual communication between the first component 52 and the communication device 56 in the paired state has been satisfied, the communication device controller 70 proceeds to step S30.

In a case where the user operates the communication device operating portion 78 to disconnect the mutual communication between the first component 52 and the communication device 56 in the paired state in step S28, the communication device controller 70 proceeds to step S30. In step S30, the communication device controller 70 disconnects the mutual communication between the first component 52 and the communication device 56 in the paired state, and then ends processing. For example, in a case where the setting mode is being continued in step S30, the screen 76A shows the second predetermined image instead of the first predetermined image.

A process executed by the first controller 58 to control the first wireless communicator 60 and the first storage 62 will now be described with reference to FIGS. 6 to 8. In a case where electric power is supplied to the first controller 58, the first controller 58 starts the process of the flowchart shown in FIG. 6 from step S41. In a case where the flowchart shown in FIG. 6 ends, the first controller 58 repeats the process from step S41 of FIG. 6 in predetermined cycles until, for example, the supply of electric power stops.

In step S41, the first controller 58 determines whether the first component 52 is paired with the communication device 56. In a case where the first component 52 is paired with the communication device 56, the first controller 58 proceeds to step S42. In a case where the first component 52 is not paired with the communication device 56, the first controller 58 ends processing. From at least step S41, the first component 52 performs mutual communication with the communication device 56 in the paired state. In a case where the first component 52 is paired with the communication device 56, the first component 52 can perform mutual communication with the communication device 56 in the paired state from at least step S41. The communication device controller 70 can determine whether the communication device 56 is performing mutual communication with the first component 52 in the paired state in step S42.

In step S42, the first controller 58 determines whether the first wireless communicator 60 receives the second identification information from the communication device 56. In a case where the first wireless communicator 60 has received the second identification information from the communication device 56, the first controller 58 proceeds to step S43. In a case where the first wireless communicator 60 does not receive the second identification information from the communication device 56, the first controller 58 ends processing.

In step S43, the first controller 58 controls the first storage 62 so that the first storage 62 stores the second identification information, and then proceeds to step S44. In step S44, the first controller 58 determines whether the first controller 58 detects disconnection of the mutual communication between the first component 52 and the communication device 56 in the paired state. The first controller 58 determines that the first controller 58 detects disconnection of the mutual communication between the first component 52 and the communication device 56 in the paired state, for example, in at least one of a case where the first controller 58 cannot establish wireless communication with the communication device 56 and a case where the first controller 58 receives a disconnection notification of the mutual communication between the first component 52 and the communication device 56 in the paired state from the communication device 56. In a case where the first controller 58 has detected disconnection of the mutual communication between the first component 52 and the communication device 56 in the paired state, the first controller 58 proceeds to step S47.

In a case where the first controller 58 does not detect disconnection of the mutual communication between the first component 52 and the communication device 56 in the paired state, the first controller 58 proceeds to step S45. In step S45, the first controller 58 determines whether a first predetermined time elapses. The first controller 58 determines that the first predetermined time has elapsed, for example, in a case where the time elapsed from a point of time at which step S42 or S43 was executed is longer than or equal to the first predetermined time. The first predetermined time is, for example, 30 seconds or longer and 90 seconds or shorter. The first predetermined time is, for example, 50 seconds or longer and 70 seconds or shorter. The first predetermined time is, for example, 60 seconds. In a case where the first predetermined period does not elapse, the first controller 58 returns to step S44. In a case where the first predetermined time has elapsed, the first controller 58 proceeds to step S46.

In step S46, the first controller 58 deletes the second identification information from the first storage 62, and then ends processing. The first controller 58 can omit step S46. In a case where step S46 is omitted, the first controller 58 ends processing after step S45. In a case where step S46 is omitted and the first controller 58 restarts the process from step 41, if the second identification information received by the first controller 58 from the communication device 56 in step S43 is the same as the second identification information already stored, the first controller 58 controls the first storage 62 so that the first storage 62 does not store the second identification information again.

In step S47, the first controller 58 determines whether the first wireless communicator 60 receives the second identification information and the appendix information from the second wireless communicator 66. In a case where the first wireless communicator 60 does not receive the second identification information and the appendix information from the second wireless communicator 66, the first controller 58 proceeds to step S48.

In step S48, the first controller 58 determines whether a second predetermined time elapses. The first controller 58 determines that the second predetermined time has elapsed, for example, in a case where the time elapsed from a point of time at which step S44 was executed is longer than or equal to the second predetermined time. The second predetermined time is, for example, 30 seconds or longer and 90 seconds or shorter. The second predetermined time is, for example, 50 seconds or longer and 70 seconds or shorter. The second predetermined time is, for example, 60 seconds. In a case where the second predetermined time does not elapse, the first controller 58 returns to step S47. In a case where the second predetermined time has elapsed, the first controller 58 proceeds to step S46. In a case where step S46 is omitted, the first controller 58 can end processing after step S48. The second predetermined time can be the same as or different from the first predetermined time.

In a case where the first wireless communicator 60 has received the second identification information and the appendix information from the second wireless communicator 66 in step S47, the first controller 58 proceeds to step S49. In step S49, the first controller 58 compares the second identification information received from the second component 54 with the second identification information received from the communication device 56. Then, the first controller 58 proceeds to step S50.

In step S50, the first controller 58 determines whether the second identification information received from the second component 54 matches the second identification information received from the communication device 56. In a case where the second identification information received from the second component 54 matches the second identification information received from the communication device 56, the first controller 58 proceeds to step S51. In a case where the second identification information received from the second component 54 does not match the second identification information received from the communication device 56, the first controller 58 returns to step S47. In a case where the second identification information received from the second component 54 does not match the second identification information received from the communication device 56, the first controller 58 can be configured to wait for a predetermined time until the first wireless communicator 60 receives second identification information from a second component 54 that has the same second identification information as the second identification information received by the first controller 58 from the communication device 56. For example, the predetermined time can be the same as or different from the first predetermined time and the second predetermined time.

In step S51, the first controller 58 controls the first storage 62 so that the first storage 62 stores the second identification information and the appendix information. Then, the first controller 58 proceeds to step S52. In step S52, the first controller 58 controls the first wireless communicator 60 so that the first wireless communicator 60 transmits the first identification information. Then, the first controller 58 ends processing.

In the present embodiment, the pairing of the first component 52 with the second component 54 is completed in a case where the first storage 62 stores the second identification information and the second storage 68 stores the first identification information in a state in which the mutual communication between the first component 52 and the communication device 56 in the paired state is disconnected and the first component 52 is not paired with the second component 54. In the present embodiment, the pairing of the first component 52 with the second component 54 is performed via the communication device 56 including the display unit 76. Thus, the first component 52 can be paired with the second component 54 even if the first component 52 and the second component 54 do not include at least one of a display unit, a program, and an operating portion that allow the user to select a pairing subject.

Modifications

The description related with the above embodiment exemplifies, without any intention to limit, an applicable form of a control system for a human-powered vehicle according to the present disclosure. The control system for a human-powered vehicle according to the present disclosure is applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

The first component 52 can be the drive unit 44. In a case where the first component 52 is the drive unit 44, the drive unit operating portion 46 can be integrated with the drive unit 44.

The first component 52 can be the drive unit 44, the drive unit operating portion 46, an operating device for the electric transmission device 54A, an electric adjustable seatpost, an electric suspension, a cycle computer, the electric transmission device 54A, the battery 40, a brake, an electric lock, a clock, or a heart rate monitor.

The control system 50 can include at least one third component that differs from the first component 52 and the second component 54. For example, the second controller 64 is configured to control the second wireless communicator 66 so that the second wireless communicator 66 transmits the first identification information from the second component 54 to the third component. In a case where the second controller 64 is configured to control the second wireless communicator 66 so that the second wireless communicator 66 transmits the first identification information from the second component 54 to the third component, the second component 54 is configured to perform wireless communication with the third component through a predetermined communication protocol. For example, the predetermined communication protocol differs from the communication protocol through which the first component 52 and the communication device 56 perform mutual communication in a paired state. For example, the second component 54 is configured to be pairable with the third component through the predetermined communication protocol. The third component includes, for example, third storage that stores the first identification information. The first controller 58 can be configured to control the third component via the second component 54. For example, the third component can be configured to transmit information related to the third component to the first component 52 via the second component 54. The at least one third component can include, for example, at least one of the drive unit 44, the drive unit operating portion 46, an operating device for the electric transmission device 54A, an electric adjustable seatpost, an electric suspension, a cycle computer, the electric transmission device 54A, the battery 40, a brake, an electric lock, a clock, and a heart rate monitor.

In a modification in which the control system 50 includes at least one third component, in a case where the first component 52 is the drive unit 44 or the drive unit operating portion 46, and the second component 54 is the electric transmission device 54A, the at least one third component can include at least one of an operating device for the electric transmission device 54A, an electric adjustable seatpost, an electric suspension, a cycle computer, the electric transmission device 54A, the battery 40, a brake, an electric lock, a clock, and a heart rate monitor.

In a modification in which the control system 50 includes at least one third component, in a case where the first component 52 is the drive unit 44 or the drive unit operating portion 46, and the second component 54 is a rear transmission, the third component can include at least one of an operating device for the electric transmission device 54A, an electric adjustable seatpost, an electric suspension, a cycle computer, a front transmission, the battery 40, a brake, an electric lock, a clock, and a heart rate monitor.

In a modification in which the control system 50 includes at least one third component, the first component 52 can be the drive unit 44 or the drive unit operating portion 46, the second component 54 can be a front transmission, and the third component can be a rear transmission.

The first component 52 can be configured to be paired with the second component 54 in a state in which the mutual communication between the communication device 56 and the first component 52 in the paired state is not disconnected. In this case, for example, the communication protocol used for the pairing of the communication device 56 with the first component 52 differs from that for the pairing of the first component 52 with the second component 54.

Figure 5:
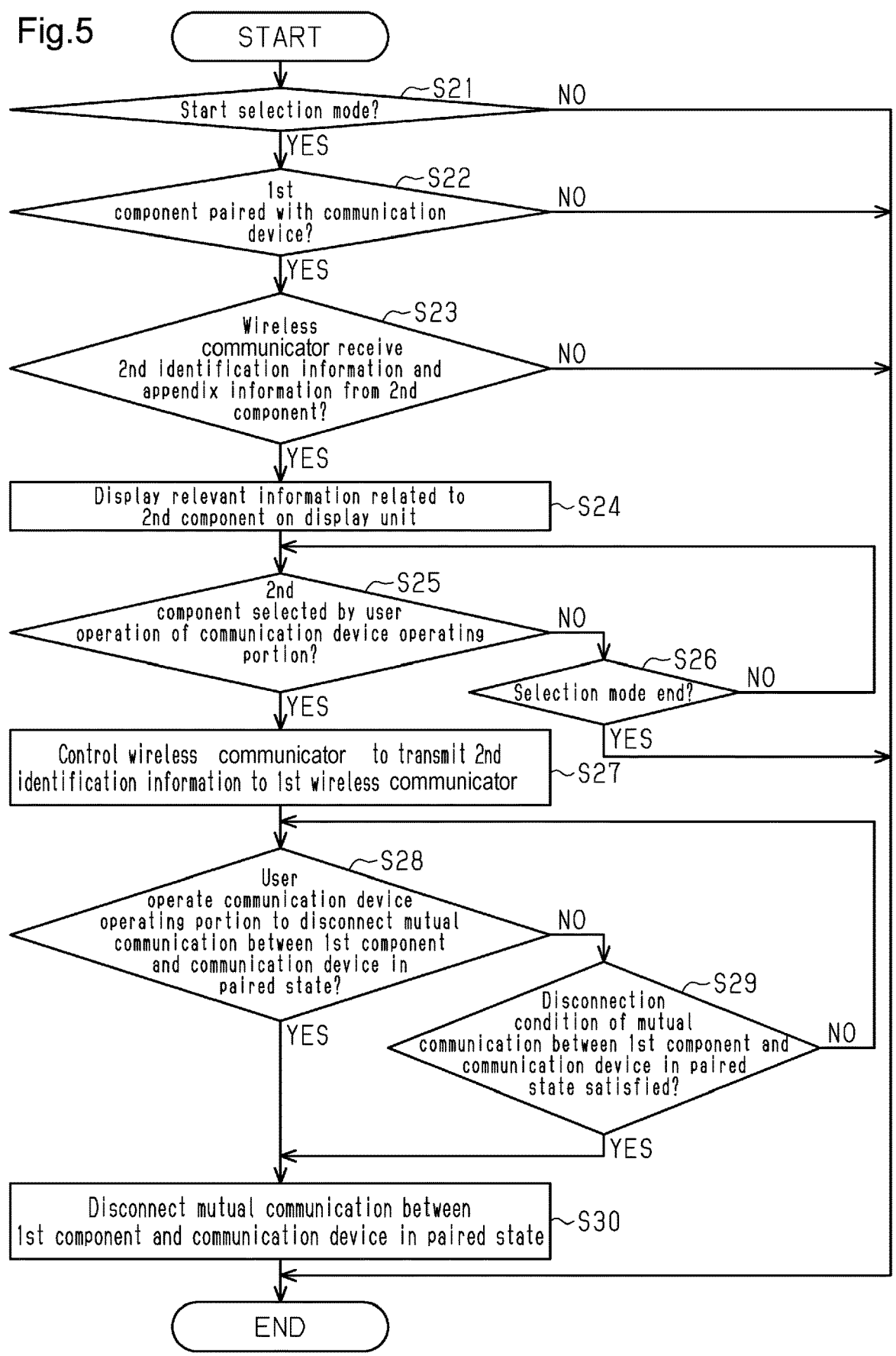
FIG. 5 is a flowchart illustrating a process executed by a communication device controller shown in FIG. 2.

In step S23 of FIG. 5, the communication device controller 70 can determine whether the wireless communicator 72 receives the second identification information from the second component 54. The communication device controller 70 determines that the wireless communicator 72 has received the second identification information from the second component 54, for example, in a case where the wireless communicator 72 receives the second identification information from the second component 54 through broadcast communication. In a case where the wireless communicator 72 receives the second identification information from the second component 54, the communication device controller 70 proceeds to step S24. In a case where the wireless communicator 72 does not receive the second identification information from the second component 54, the communication device controller 70 ends processing.

Figure 6:
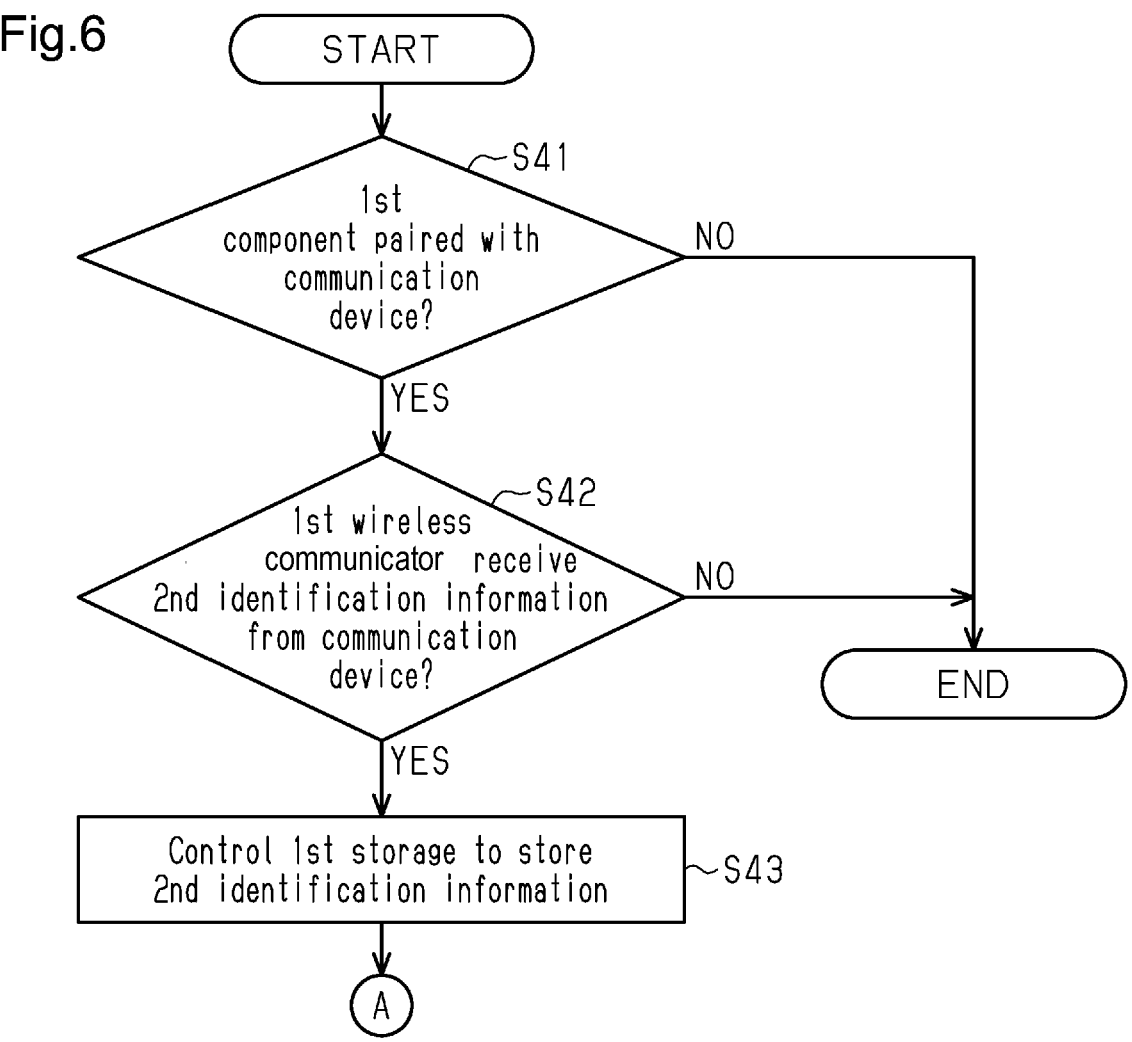
FIG. 6 is a first part of a process executed by a first electronic controller shown in FIG. 2.
Figure 7:
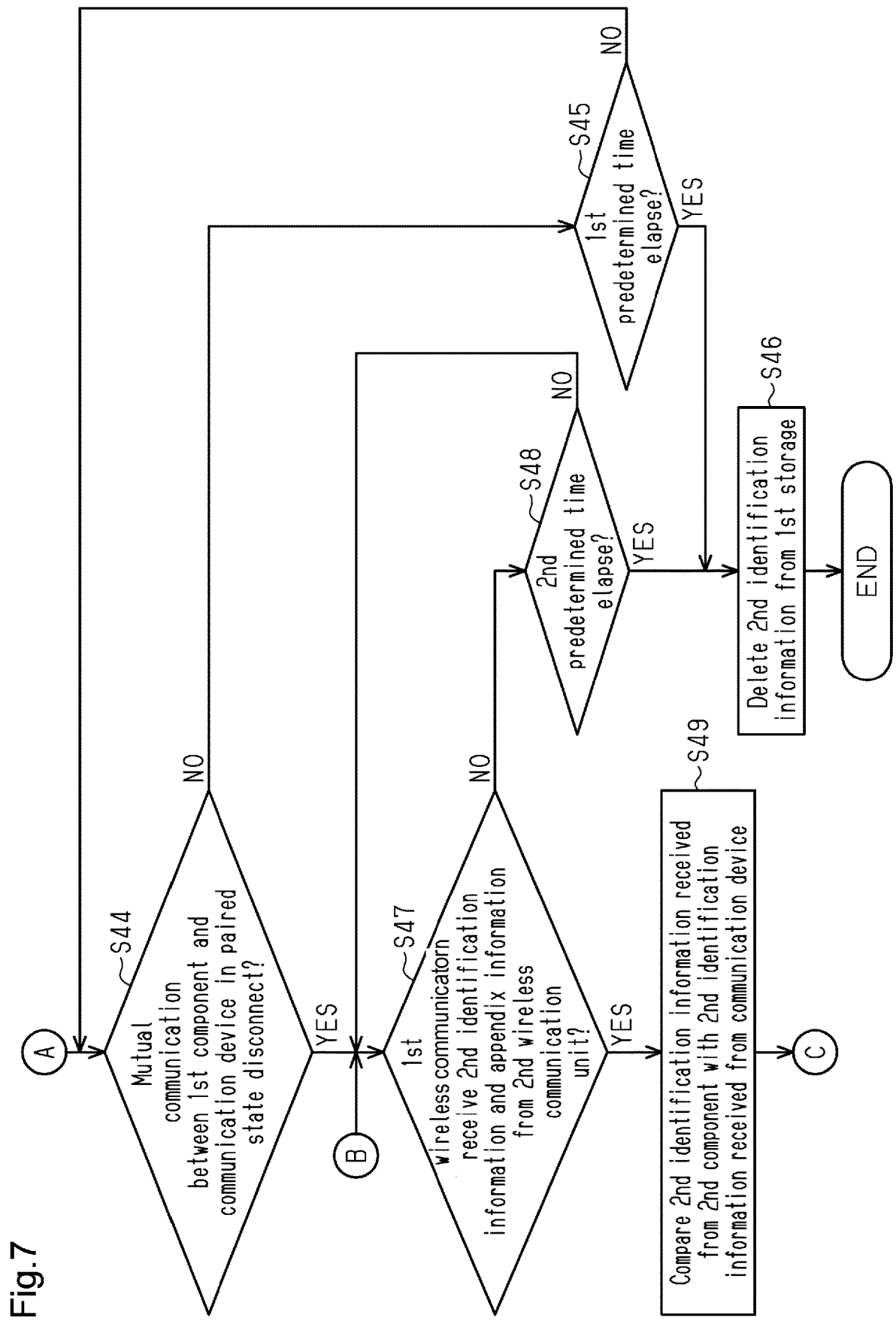
FIG. 7 is a second part of the process executed by the first electronic controller shown in FIG. 2.

In step S42 of FIG. 6, the first controller 58 can determine whether the first wireless communicator 60 receives the second identification information and the appendix information from the communication device 56. In this case, the first controller 58 proceeds to step S43 of FIG. 6 in a case where the first wireless communicator 60 has received the second identification information and the appendix information from the communication device 56. In a case where the first wireless communicator 60 does not receive the second identification information and the appendix information from the communication device 56, the first controller 58 ends processing.

In a case where the first component 52 obtains the appendix information from the communication device 56, the first component 52 does not have to obtain the appendix information from the second component 54. In a case where the first controller 58 determines whether the first wireless communicator 60 receives the second identification information and the appendix information from the communication device 56 in step S42 of FIG. 6, the first controller 58 can determine whether the first wireless communicator 60 receives the second identification information from the communication device 56 in step S47 of FIG. 7. In this case, in a case where the first wireless communicator 60 receives the second identification information from the communication device 56, the first controller 58 proceeds to step S49 of FIG. 7. In a case where the first wireless communicator 60 does not receive the second identification information from the communication device 56, the first controller 58 proceeds to step S48 of FIG. 7.

The first component 52 can be configured not to obtain the appendix information. In a case where the first component 52 is configured not to obtain the appendix information, the first controller 58 can omit, for example, step S51. In a case where the first component 52 is configured not to obtain the appendix information, the first controller 58 does not have to determine whether the appendix information is received in step S47. For example, in a case where the first wireless communicator 60 receives the second identification information from the communication device 56 in step S47, the first controller 58 proceeds to step S49. For example, in a case where the first wireless communicator 60 does not receive the second identification information from the communication device 56 in step S47, the first controller 58 proceeds to step S48.

The phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

Ordinal numerals such as "first", "second", and "third" as used in this specification are only to differentiate multiple members having the same name and these words have no special meaning.

What is claimed is:

1. A control system for a human-powered vehicle, the control system comprising:
   a first component configured to be coupled to a vehicle body of the human-powered vehicle; and
   a second component configured to be coupled to the vehicle body,
   the first component including a first electronic controller, a first wireless communicator, and a first storage,
   the second component including a second electronic controller, a second wireless communicator, and a second storage,
   the first storage being configured to store first identification information of the first component and second identification information of the second component,
   the second storage being configured to store the first identification information and the second identification information,
   the second electronic controller being configured to control the second wireless communicator so that the second wireless communicator transmits the second identification information stored in the second storage to a communication device,
   the first electronic controller being configured to control the first wireless communicator so that the first wireless communicator transmits the first identification information stored in the first storage to the second component in response to receipt of the second identification information by the first wireless communicator from the communication device,
   the second electronic controller being configured to control the second storage so that the second storage stores the first identification information in response to receipt of the first identification information by the second wireless communicator from the first component.

2. The control system according to claim 1, wherein the first electronic controller is configured to control the first storage so that the first storage stores the second identification information obtained from the communication device through wireless communication.

3. The control system according to claim 2, wherein the second electronic controller is configured to control the second wireless communicator so that the second wireless communicator transmits the second identification information to the first component; and
   the first electronic controller is configured to compare the second identification information received from the second component with the second identification information received from the communication device.

4. The control system according to claim 1, wherein the second electronic controller is configured to control the second wireless communicator so that the second wireless communicator continuously or intermittently transmits the second identification information to the first component; and
   the second electronic controller is configured to control the second wireless communicator so that the second wireless communicator stops transmission of the second identification information upon receipt of the first identification information.

5. A control system for a human-powered vehicle, the control system comprising:
   a first component configured to be coupled to a vehicle body of the human-powered vehicle; and
   a second component configured to be coupled to the vehicle body,
   the first component including a first electronic controller, a first wireless communicator, and a first storage,
   the second component including a second electronic controller, a second wireless communicator, and a second storage,
   the first storage being configured to store first identification information of the first component and second identification information of the second component,
   the second storage being configured to store the first identification information and the second identification information,
   the second electronic controller being configured to control the second wireless communicator so that the second wireless communicator transmits the second identification information stored in the second storage to a communication device, the first electronic controller being configured to control the first storage so that the first storage stores the second identification information in response to receipt of the second identification information by the first wireless communicator from the communication device, the second electronic controller being configured to control the second wireless communicator so that the second wireless communicator transmits the second identification information to the first component, the first electronic controller being configured to compare the second identification information received from the second component with the second identification information received from the communication device.

6. The control system according to claim 5, wherein the second electronic controller is configured to control the second wireless communicator so that the second wireless communicator transmits appendix information that is appended to the second identification information to the first component; and the first electronic controller is configured to store the appendix information received from the second component to the first storage in a case where the second identification information received from the second component matches the second identification information received from the communication device.

7. The control system according to claim 6, wherein the appendix information includes at least one of type, serial number, model, and icon of the second component.

8. The control system according to claim 1, further comprising:

the communication device, the communication device including a communication device controller and a wireless communicator; and the communication device controller being configured to control the wireless communicator so that the wireless communicator transmits the second identification information to the first component in response to receipt of the second identification information from the second component through wireless communication.

9. The control system according to claim 8, wherein the communication device further includes a display; and the communication device controller is configured to control the display so that the display displays relevant information related to the second component upon receipt of the second identification information.

10. The control system according to claim 9, wherein the relevant information includes at least one of type, serial number, model, the second identification information, and icon of the second component.

11. The control system according to claim 8, wherein the communication device further includes a communication device operating portion; and the communication device controller is configured to control the wireless communicator so that the wireless communicator transmits the second identification information to the first component in response to selection of the second component by a user through the communication device operating portion.

12. The control system according to claim 1, wherein the first component is configured to be paired with the second component in a state in which the communication device is paired with the first component.

13. The control system according to claim 1, wherein the second component includes an electric transmission device.

14. A control system for a human-powered vehicle, the control system comprising:

a communication device;

a first component configured to be coupled to a vehicle body of the human-powered vehicle, the first component being configured to perform wireless communication with the communication device; and at least one second component being different from the first component, the at least one second component being configured to be coupled to the vehicle body, the at least one second component being configured to perform wireless communication with the communication device and the first component, the first component including a first electronic controller, a first wireless communicator, and a first storage, the at least one second component including a second electronic controller, a second wireless communicator, and a second storage, the communication device including a third wireless communicator, a communication device controller and a display, the communication device being configured to control the third wireless communicator, the communication device being different from the first component and the at least one second component, in a case where the at least one second component includes a plurality of second components configured to be paired with the first component, the display including a screen configured to display relevant information related to at least one pairing candidate among the plurality of second components.

15. The control system according to claim 14, wherein the communication device further includes a communication device operating portion; and the communication device controller is configured to pair the first component with the selected one or more of the at least one second component in response to selection of one or more of the at least one second component by a user through the communication device operating portion.

16. The control system according to claim 14, wherein the relevant information includes at least one of type, serial number, model, second identification information, and icon of the at least one second component.

17. The control system according to claim 14, wherein the communication device controller is configured to control the display so that the display does not display information related to the at least one second component in a case where a manufacturer of the at least one second component differs from a predetermined manufacturer.

18. The control system according to claim 15, wherein the first component is configured to be paired with the one or more of the at least one second component in a state in which the communication device is paired with the first component.

19. The control system according to claim 1, wherein the first component is attachable to the human-powered vehicle.

20. The control system according to claim 1, wherein the human-powered vehicle includes a drive unit system; the drive unit system includes a drive unit and a drive unit operating portion;

the drive unit includes a motor configured to apply a propulsion force to the human-powered vehicle;

the drive unit operating portion is configured to operate the drive unit; and the first component includes the drive unit or the drive unit operating portion.

\* \* \* \* \*